(12) United States Patent
Koide et al.

(10) Patent No.: US 7,298,899 B2
(45) Date of Patent: Nov. 20, 2007

(54) IMAGE SEGMENTATION METHOD, IMAGE SEGMENTATION APPARATUS, IMAGE PROCESSING METHOD, AND IMAGE PROCESSING APPARATUS

(75) Inventors: Tetsushi Koide, Higashihiroshima (JP); Hans Juergen Mattausch, Higashihiroshima (JP); Takashi Morimoto, Higashihiroshima (JP); Youmei Harada, Higashihiroshima (JP)

(73) Assignee: President of Hiroshima University, Higashihiroshima-shi (JP)

( * ) Notice: Subject to any disclaimer, the term of this patent is extended or adjusted under 35 U.S.C. 154(b) by 892 days.

(21) Appl. No.: 10/445,247

(22) Filed: May 27, 2003

(65) Prior Publication Data

US 2003/0219157 A1 Nov. 27, 2003

(30) Foreign Application Priority Data

May 27, 2002 (JP) ............................. 2002-152491

(51) Int. Cl.
*G06K 9/34* (2006.01)
*G06K 9/62* (2006.01)

(52) U.S. Cl. ...................................... 382/173; 382/156
(58) Field of Classification Search ........ 382/155–161, 382/173
See application file for complete search history.

(56) References Cited

U.S. PATENT DOCUMENTS 5,274,747 A * 12/1993 Furuta et al. .................. 706/43
5,283,839 A * 2/1994 Edelman et al. ............. 382/103
5,313,532 A * 5/1994 Harvey et al. ............... 382/156
5,497,430 A * 3/1996 Sadovnik et al. ............ 382/156
2002/0181799 A1* 12/2002 Matsugu et al. ............. 382/260

FOREIGN PATENT DOCUMENTS

JP 7-121695 5/1995

(Continued)

OTHER PUBLICATIONS

Naeem Shareff, DeLiang L. Wang and Roni Yagel, "Segmentation of Medical Images Using LEGION", IEEE Trans. Medical Imaging, vol. 18, No. 1, Jan. 1999.*

(Continued)

*Primary Examiner*—Wenpeng Chen
*Assistant Examiner*—Yuzhen Ge
(74) *Attorney, Agent, or Firm*—Oblon, Spivak, McClelland, Maier & Neustadt, P.C.

(57) ABSTRACT

Cells i corresponding to pixels are initialized into a non-excitation state, to calculate coupling weights $W_{ik}$ between the eight cells k adjacent to the cells i, thereby determining leader cells $p_i=1$ based on calculation results. Next, one leader cell yet to be excited is selected as a self-excitable cell. The selected cell is put into the excitation state, the excitable cells are selected based on the coupling weights between the adjacent cells, and the selected cells are put into the excitation state. These operations are repeated until no excitable cell is detected any more and, if there no excitable cell is detected any more, inhibition processing is performed, thereby completing image segmentation of one region. These operations are repeated until there is no non-excited and non-inhibited leader cell any more, thereby pinpointing regions belonging to the same category from an input image and identifying them as an image segmentation regions.

24 Claims, 16 Drawing Sheets

FOREIGN PATENT DOCUMENTS

JP  11-185033  7/1999
JP  11-339041  12/1999

OTHER PUBLICATIONS

U.S. Appl. No. 10/445,247, filed May 27, 2003, Koide et al.
U.S. Appl. No. 10/915,559, filed Aug. 11, 2004, Koide et al.
J. C. Russ, The Image Processing Handbook, Third Edition, chapter 6, pp. 371-429, "Segmentation and Thresholding", 1999.
S. Sarkar, et al., IEEE Transactions on Pattern Analysis and Machine Intelligence, vol. 15, No. 3, pp. 256-268, "Integration, Inference, and Management of Spatial Information Using Bayesian Networks: Perceptual Organization", Mar. 1993.
S. M. Bhandarkar, et al., IEEE Transactions on Evolutionary Computation, vol. 3, No. 1, pp. 1-21, "Image Segmentation Using Evolutionary Computation", Apr. 1999.
E. Mozef, et al., Proceedings of SPIE, vol. 2784, pp. 120-125, "Parallel Architecture Dedicated to Image Component Labelling in O(n Log n): FPGA Implementation", 1996.
Y. Ishiyama, et al., Systems and Computers in Japan, vol. 26, No. 14, pp. 67-76, "Labeling Board Based on Boundary Tracking", 1995.
Y. Ishiyama, et al., The Institute of Electronics, Information, and Communication Engineers Research Paper Magazine D-II, vol. J78-D-II, No. 1, pp. 69-75, "Labelling Board Based on Boundary Tracking", 1995.
S-D. Jean, et al., Proceedings of Int'l Symp. on Cir. & Sys. (ISCAS), Part 2 (of 6), pp. 565-568, "A New Algorithm and its VLSI Architecture Design for Connected Component Labeling", 1994.
D-L. Wang, et al., Neutral Computation, vol. 9, No. 4, pp. 1-30, "Image Segmentation Based on Oscillatory Correlation", 1997.
H. Ando, et al., Proc. 5th International Conference on Neutral Information Proceeding (ICONIP'98), pp. 586-589, "Oscillator Networks for Image Segmentation and Their Circuits Using Pulse Modulation Methods", Oct. 21, 1998.
H. Ando, et al., IEICE Trans. Fundamentals, vol. E83-A, No. 2, pp. 329-336, "A Nonlinear Oscillator Network for Gray-Level Image Segmentation and PWM/PPM Circuits for Its VLSI Implementation" Feb. 2000.

* cited by examiner

Input image i, j, k, l: Cell (which corresponds to pixel)
W: Coupling weight

Inter-cell coupling weight

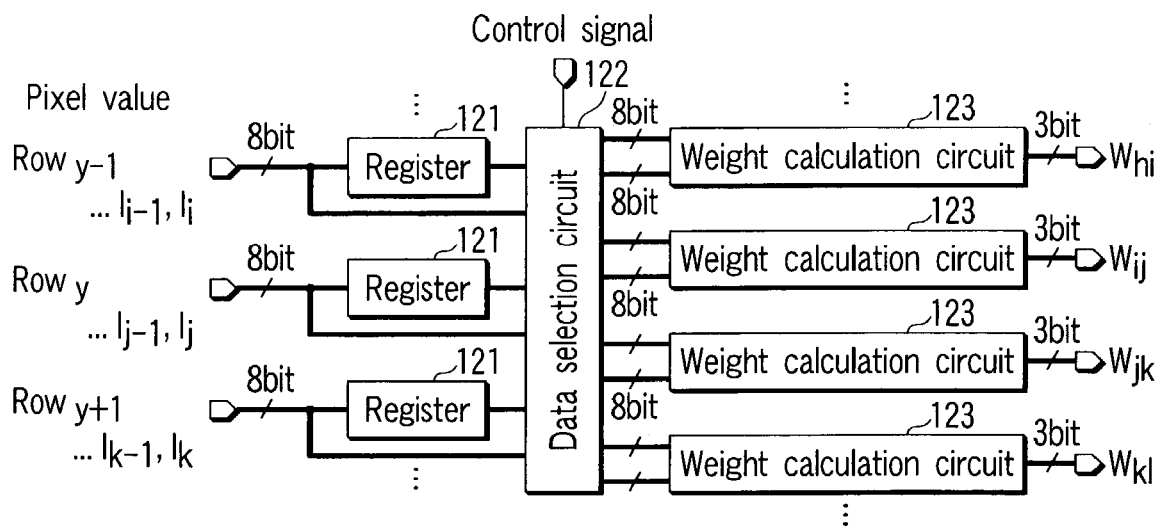
FIG. 5A  Basic configuration diagram of circuit to calculate coupling weight by pipeline processing
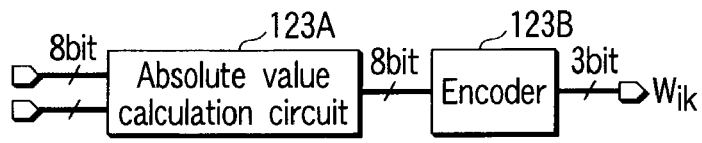
FIG. 5B  Weight calculation circuit for grayscale image
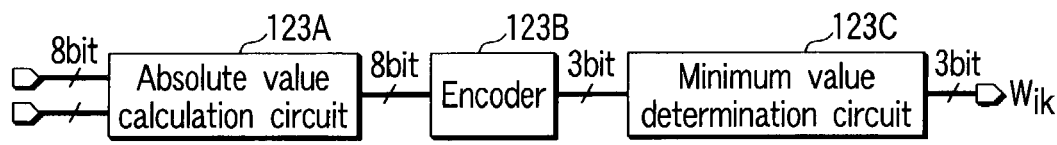
FIG. 5C  Weight calculation circuit for color image
| Input | Output |
|---|---|
| 1xxxxxxx | 000 |
| 01xxxxxx | 001 |
| 001xxxxx | 010 |
| 0001xxxx | 011 |
| 00001xxx | 100 |
| 000001xx | 101 |
| 0000001x | 110 |
| 0000000x | 111 |
FIG. 5D  x indicates a don't-care bit (0 or 1)
Example of encoder

Case where $P_5$ is decided
FIG. 6A
$W_{51}$ $W_{52}$ $W_{53}$ → $IN_1$
$W_{54}$ $W_{55}$ $W_{56}$ → $IN_2$
$W_{57}$ $W_{58}$ $W_{59}$ → $IN_3$
Order in which coupling weight data is transferred
FIG. 6B
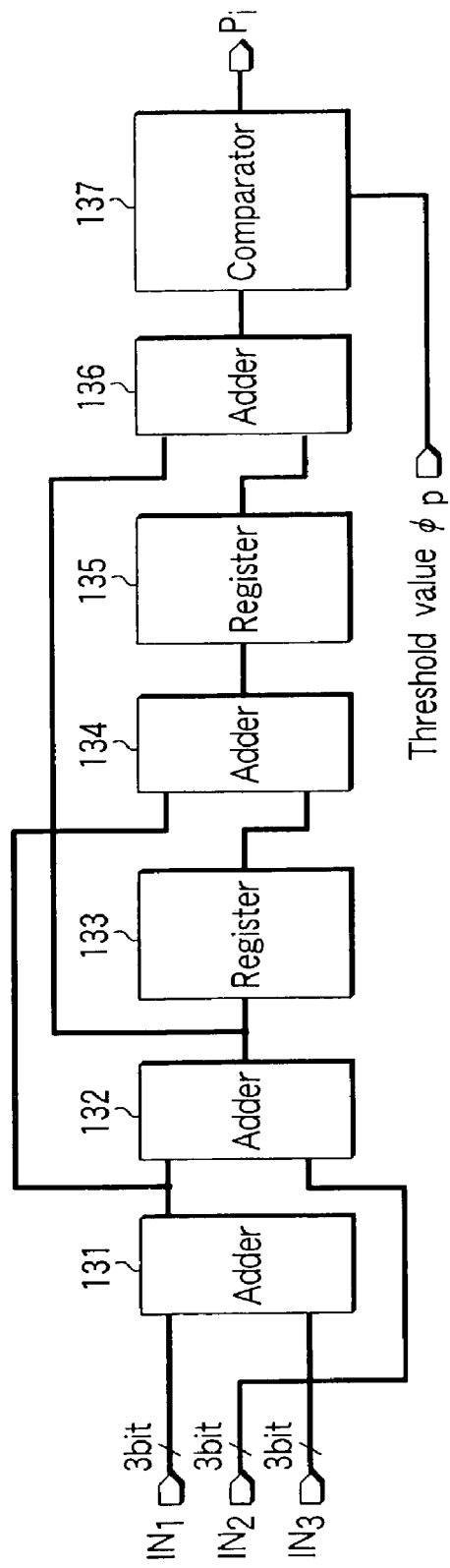
Basic configuration diagram of leader cell determination circuit
FIG. 6C

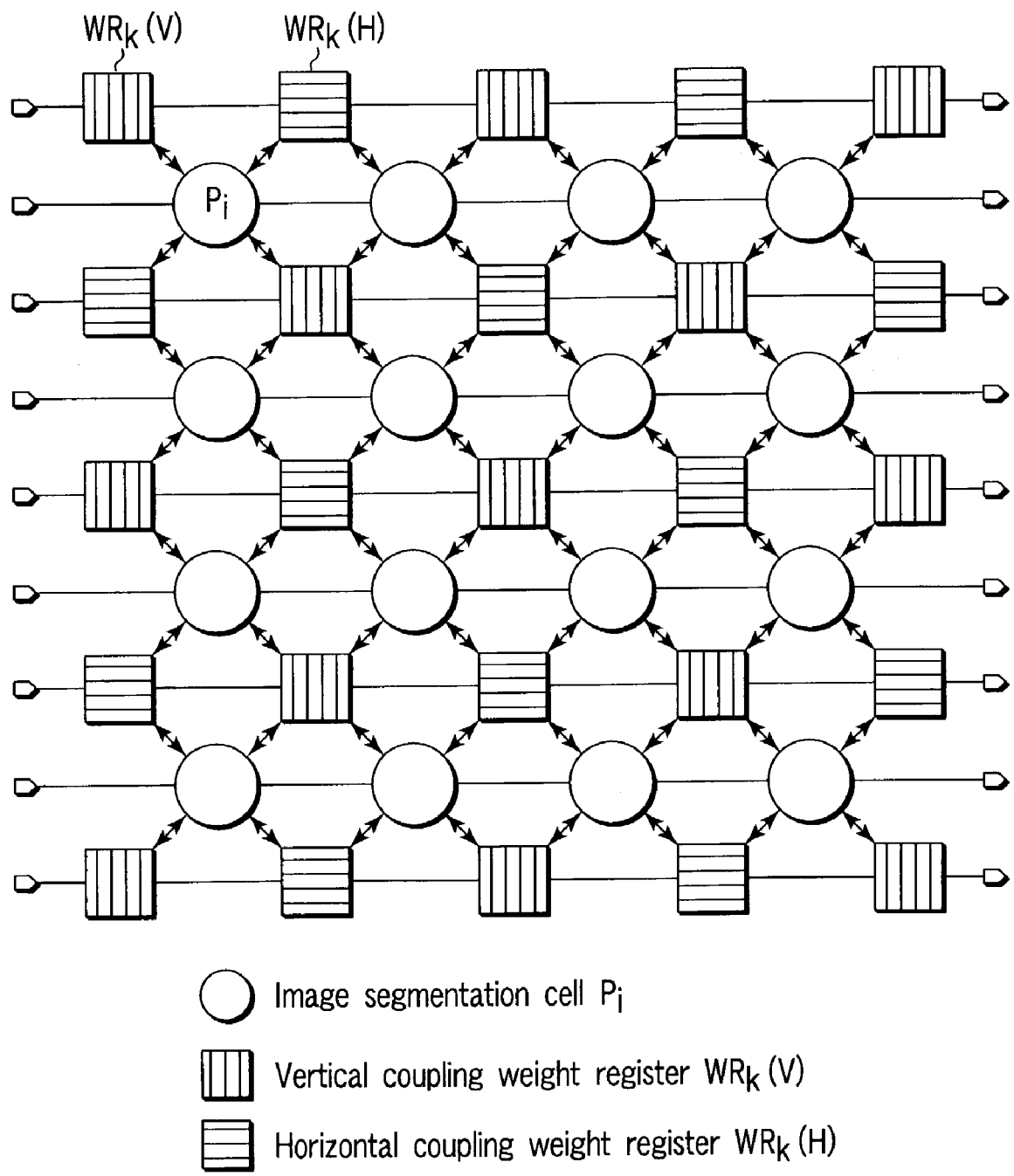
○ Image segmentation cell $P_i$
▯ Vertical coupling weight register $WR_k(V)$
▭ Horizontal coupling weight register $WR_k(H)$
F I G. 7

○ Image segmentation cell $P_i$

▦ Vertical coupling weight register $WR_k(V)$

▤ Horizontal coupling weight register $WR_k(H)$

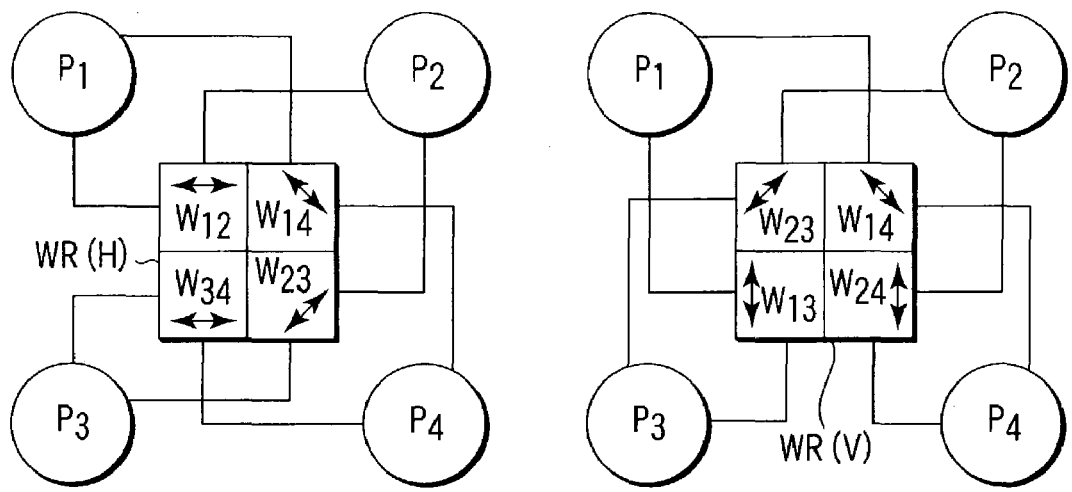
Horizontal coupling weight register   Vertical coupling weight register
F I G. 9A   F I G. 9B
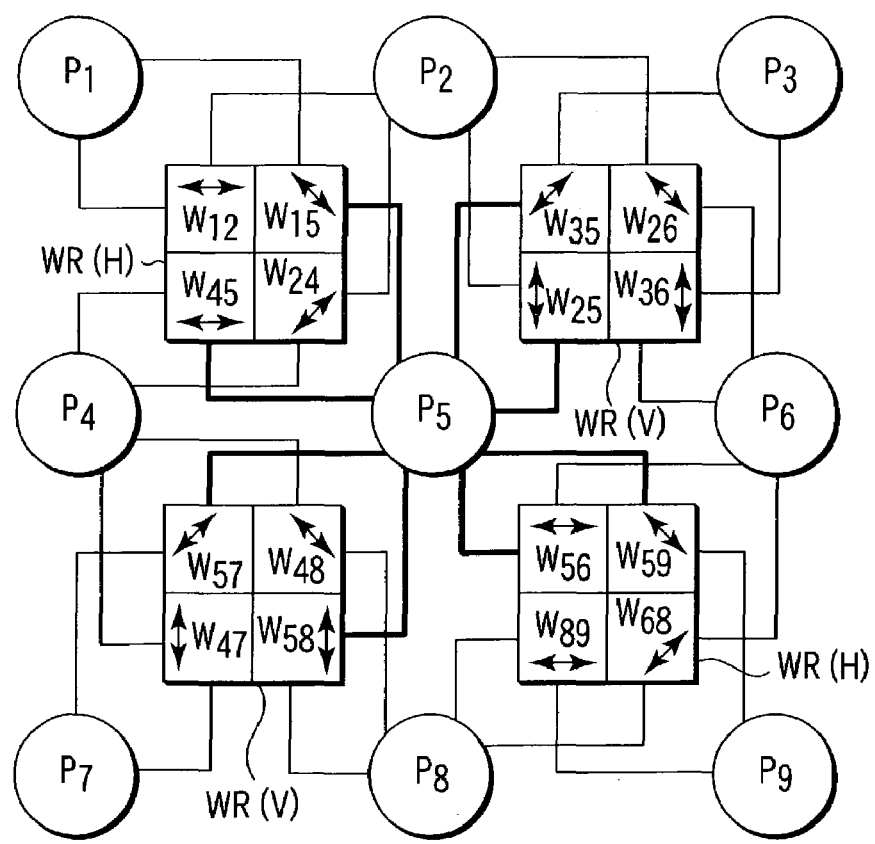
F I G. 10

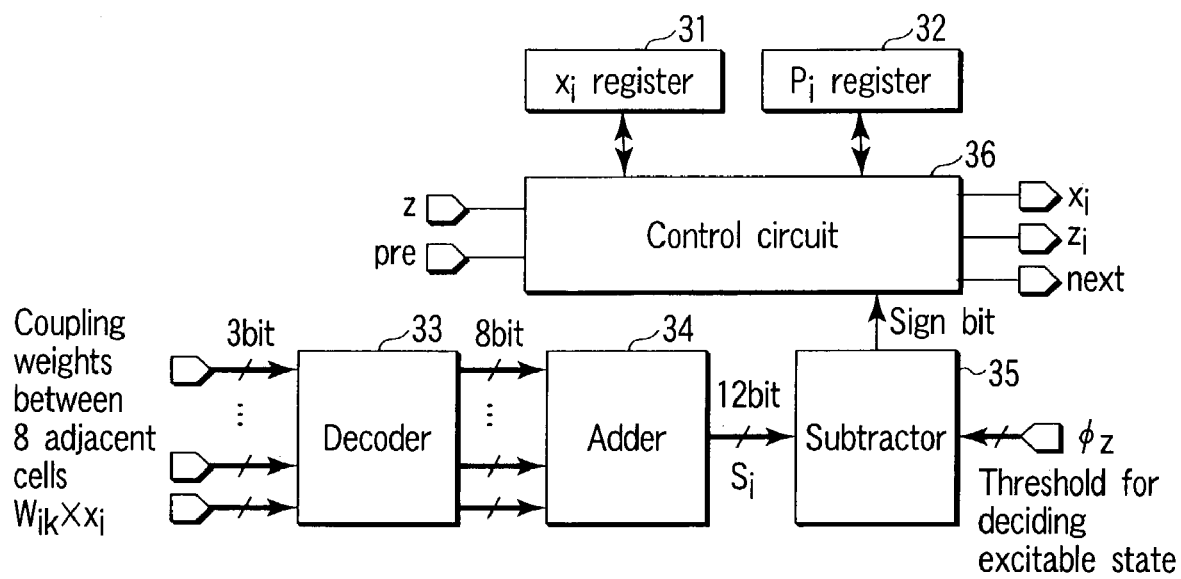
Configuration example of image segmentation cell $P_i$
(in the case where addition and subtraction are performed in parallel)
F I G. 12A
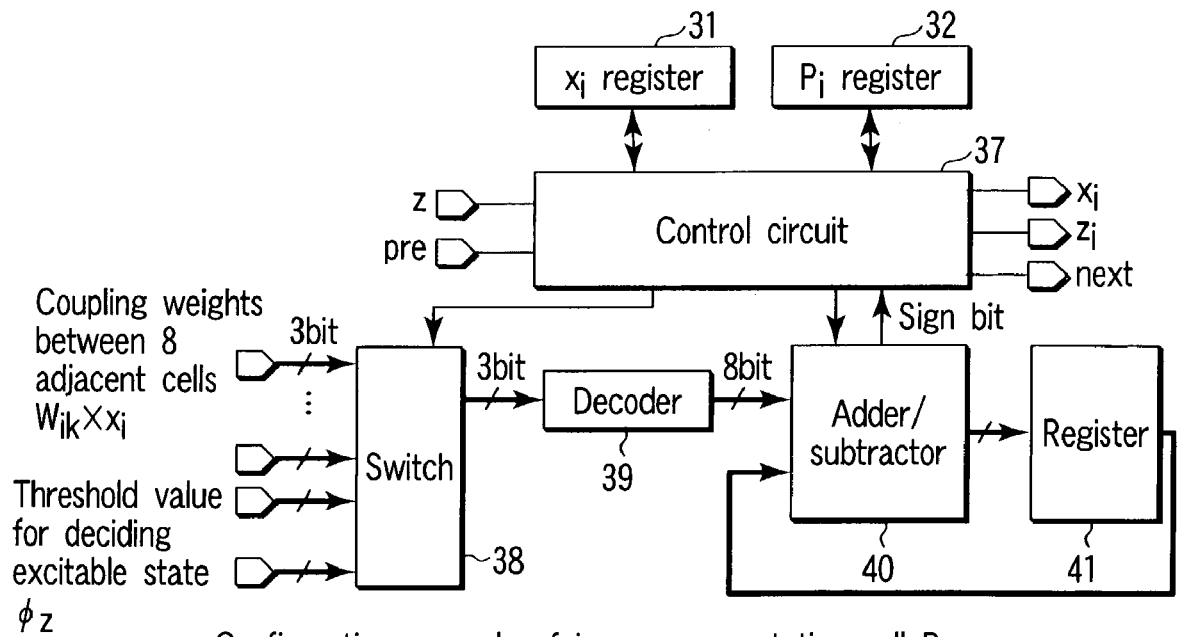
Configuration example of image segmentation cell $P_i$
(in the case where addition and subtraction are performed serially)
F I G. 12B

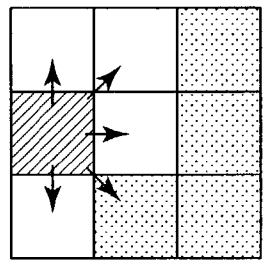
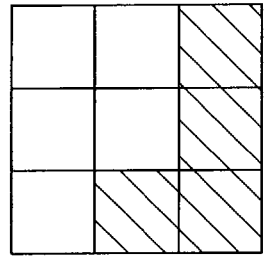
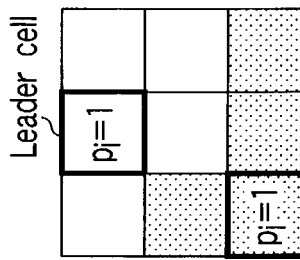
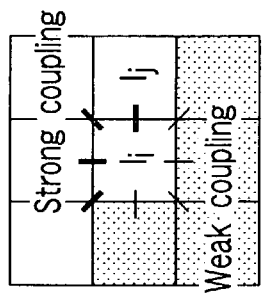
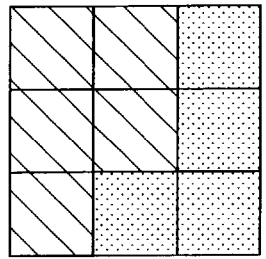
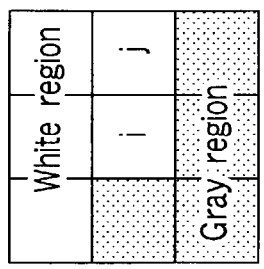
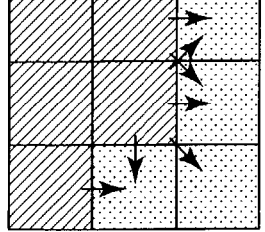
FIG. 15A Input image
FIG. 15B Calculation of coupling weight $W_{ij}$
FIG. 15C Determination of leader cell
FIG. 15D Self-excitation
FIG. 15E Excitation of dependent cells
FIG. 15F Excitation of dependent cells (continued)
FIG. 15G Inhibition (Segmentation of white region ends)
FIG. 15H Self-excitation (Segmentation of gray region starts)
FIG. 15I Inhibition (Segmentation of gray region ends)

Input image

Leader cell

Value of each cell $P_i$

Excitation order

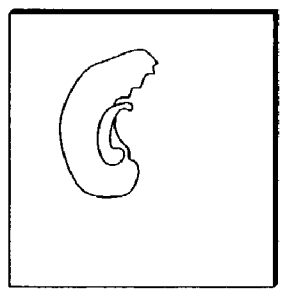
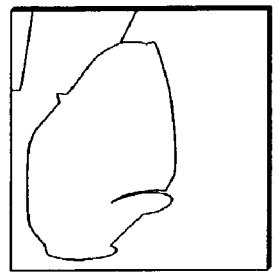
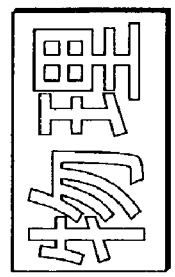
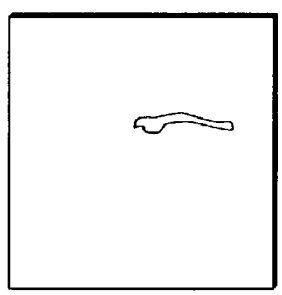
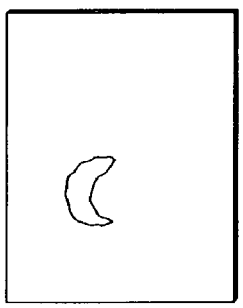
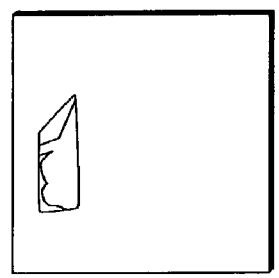
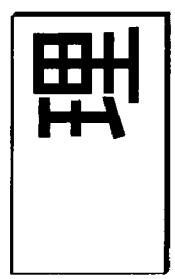
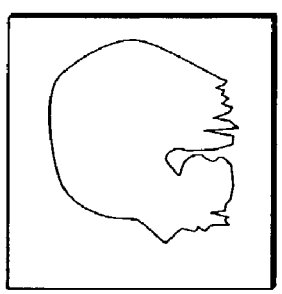
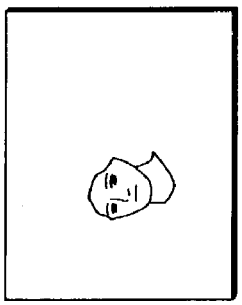
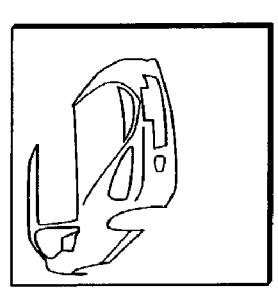
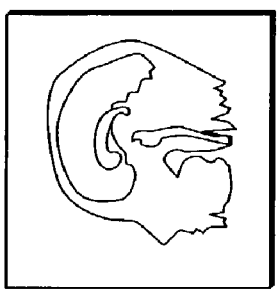
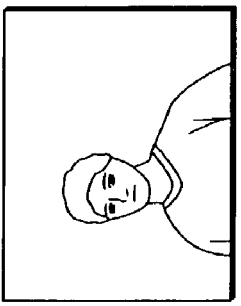
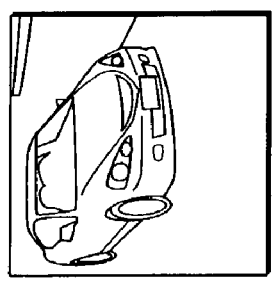
FIG. 20A  FIG. 20B  FIG. 20C  FIG. 20D
Input image → Segmentation result

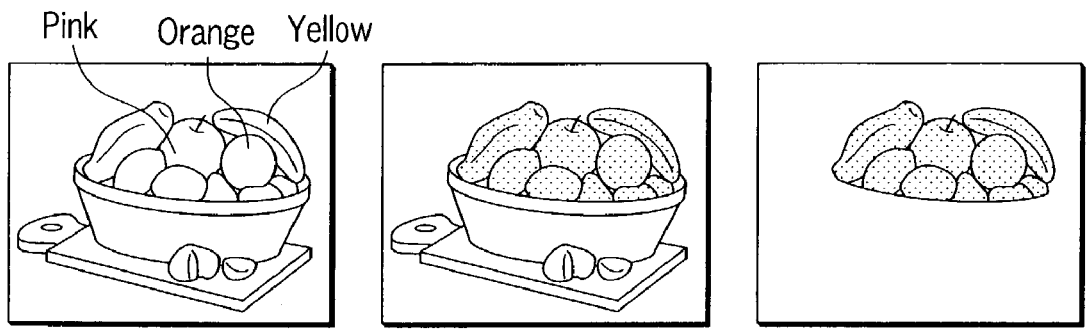
FIG. 21A  Input color image
FIG. 21B  Image converted into grayscale
FIG. 21C  Segmentation result of grayscale image
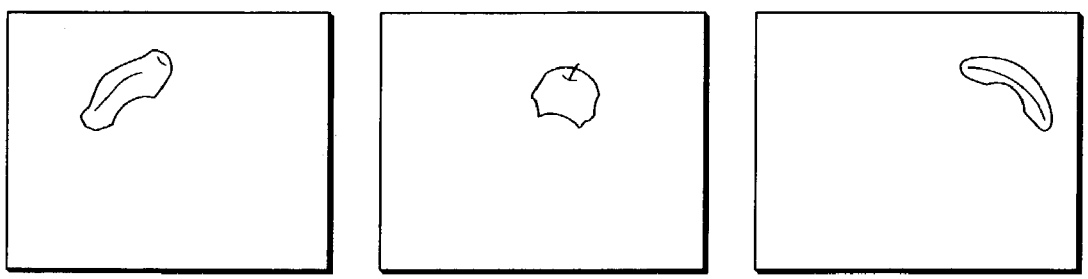
Segmentation results in the case where color image is segmented directly
FIG. 21D
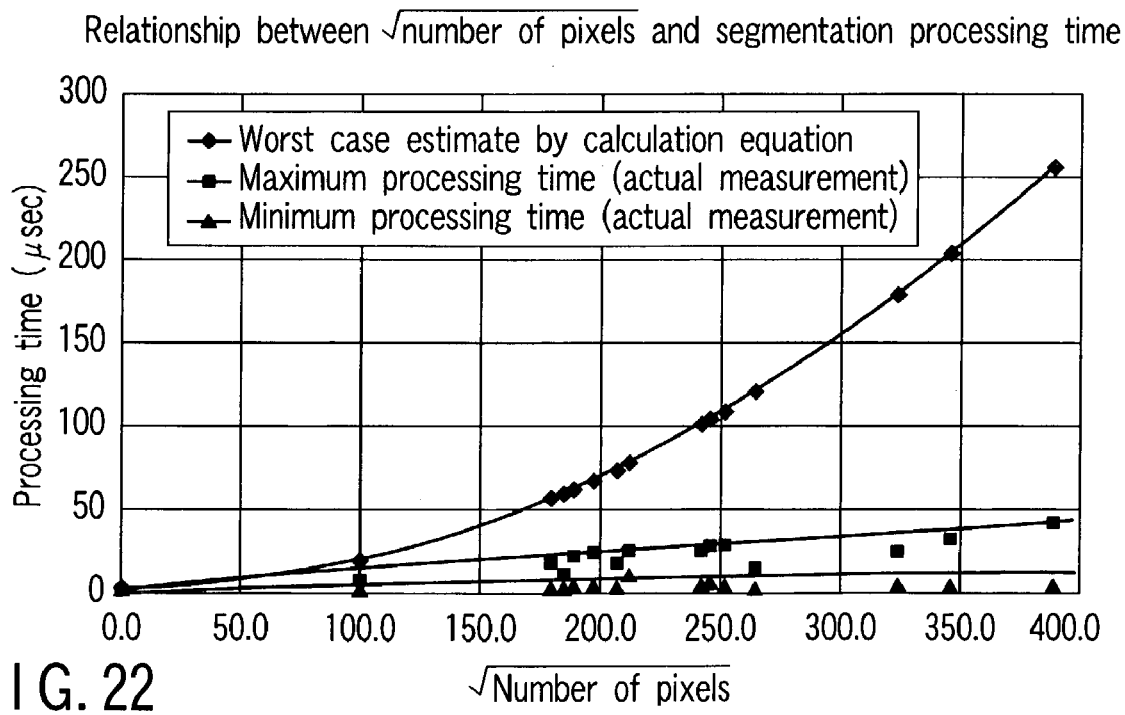
FIG. 22

IMAGE SEGMENTATION METHOD, IMAGE SEGMENTATION APPARATUS, IMAGE PROCESSING METHOD, AND IMAGE PROCESSING APPARATUS

CROSS-REFERENCE TO RELATED APPLICATIONS

This application is based upon and claims the benefit of priority from the prior Japanese Patent Application No. 2002-152491, filed May 27, 2002, the entire contents of which are incorporated herein by reference.

BACKGROUND OF THE INVENTION

1. Field of the Invention

The present invention relates to, for example, software for image segmentation/extraction in an image recognition system, a moving body detection system, a digital camera, a digital video camera, a robot vision, an authentication system by means of facial recognition, a security system, an artificial intelligence (AI) system, etc. and an image segmentation method, an image segmentation apparatus, an image processing method, and an image processing apparatus which are applicable to an image segmentation/extraction integrated circuit (IC).

2. Description of the Related Art

Recently, there is a desire for an increase in speed of image recognition in order to realize intelligent information processing technologies. For example, to realize an intelligent robot that behaves and makes a decision in nearly the same way as a human and real-time facial recognition or moving body recognition, it is necessary to speedily process visual information (information of a natural image) which is taken in from a camera etc. Especially in the case of control or image recognition for robots, the visual information needs to be processed on the fly. The visual information, however, is typically vast in amount and so it takes a considerably long time to process it using a general purpose computer, etc.

One of the fundamental and indispensable processing items required to perform image processing such as image recognition is image segmentation. This image segmentation is processing to take out an individual object (for example, a human face or a moving body such as a vehicle) from a complicated natural image which is taken in as an input, so that this processing is fundamental and indispensable in order to perform image processing such as image recognition. There have been made a number of proposals for image segmentation so far. Those image segmentation methods proposed are classified as follows.

(1) Method based on profile line
(2) Method based on region
(3) Combination of methods (1) and (2) and method which formulates logical expressions which optimize the combination Method (1) is described in detail in the following references 1 and 2. Further, method (2) is described in detail in reference 1. Even further, combination method (3) is described in detail in the following reference 3.

Reference 1: J. C. Russ, "The image Processing Handbook", CRC PRESS, (1999).

Reference 2: S. Sarker and K. L. Boyer, "Integration inference, and management of spatial information using Bayesian networks: Perceptual organization", IEEE Trans. Pattern Anal. Machine Intel., Vol. 15, pp. 256-274, (1993).

Reference 3: S. M. Bhandarker and H. Zhang, "Image segmentation using evolutionary computation", IEEE Trans. on Evolutionary Computation, Vol. 3, No. 1, (1999).

Of these image segmentation methods, method (2) based on the region is referred to as a region growth type one and attracting attention as the one that can segment an object accurately.

It is to be noted that the image segmentation methods proposed so far all premise that a color or grayscale image be processed by software. Therefore, these methods involving a complicated processing procedure and take much time in processing. To speed up this processing, preferably it is realized by hardware. A relevant algorithm, however, is complicated, making it difficult to realize the algorithm in a relatively small area. As a result, the algorithm cannot but rely on software, providing a present situation of an extreme difficulty in realization of real time processing (which takes a few seconds or so). Furthermore, the color and grayscale natural images each require one dedicated algorithm for their segmentation.

While on the other hand, for a binary image, a few hardware processing methods have been proposed so far which realize high speed labeling. See the following references for example.

Reference 4: E. Mozef et al., "Parallel architecture dedicated to image component labeling in 0(nlogn): FPGA implementation", Proceedings of SPIE, Vol. 2784, pp. 120-125, (1996).

Reference 5: Y. Ishiyama et al., "Labeling board based on boundary tracking", Systems and Computers in Japan, Vol. 26, No. 14, pp. 67-76, (1995).

Reference 6: Ishiyama et al., "Labeling board based on boundary tracking", the Institute of Electronics, Information, and Communication Engineers Research Paper Magazine D-II, Vol. J78-D-II, No. 1, pp. 69-75, (1995).

Reference 7: S. D. Jean et al., "New algorithm and its VLSI architecture design for connected component labeling", Proceedings of Int'l Symp. on Cir. &Sys. (ISCAS), Part 2 (of 6), pp. 565-568, (1994).

These methods, however, are dedicated for use in processing of binary images and handle only one-bit values for each pixel, which means that they cannot easily be applied directly to the processing of the color or grayscale natural image.

To date, D. L. Wang et al. have proposed an image segmentation algorithm for the grayscale image based on a cell network model LEGION (Locally Excitatory Globally Inhibitory Oscillator Network) (see Reference 8: D. L. Wang and D. Terman, "Image segmentation based on oscillator correlation", Neural Computation, Vol. 9, No. 4, pp. 805-836, (1997).

In this model, cells are correlated with pixels of a segmentation-subject image, so that the image is segmented using the non-linear dynamics of the cell network, based on synchronous and asynchronous oscillation states of each of the cells. To realize this directly, however, it is necessary to solve a plurality of differential equations for each of the pixels, so that the image segmentation is carried out highly accurately, but is time consuming. Therefore, to realize real time processing, it is necessary to speed up the processing by realizing it by hardware.

To this end, there is proposed a method to utilize an analog circuit in order to realize the nonlinear dynamics of the cell network based on the LEGION for a grayscale image. See the following references for example.

Reference 9: H. Ando, T, Morie, M. Nagata, and A. Iwata, "Oscillator networks for image segmentation and their circuits using pulse modulation methods", Procs. 5'th International Conference on Neural Information Processing (ICONIP'98), pp. 586-589, Kitakyushu, Oct. 21, (1998).

Reference 10: H. Ando, T. Morie, Nagata and A. Iwata, "A nonlinear oscillator network for gray-level image segmentation and PWM/PPM circuits for its VLSI implementation", IEICE Trans. Fundamentals, Vol. E83-A, No. 2, pp. 329-336, (2000).

These methods by use of an analog circuit use a capacitor to store an analog quantity. A larger capacity requires a larger area of the capacitor, which inflicts a significant restriction on a decrease in area and an increase in operating speed of a future integrated circuit in an attempt to increase its integration density. Further, handling of an analog quantity is subject to an effect of fluctuations in a manufacturing process. Therefore, much attention must be paid during the manufacturing process, Making it not easy to realize the algorithm as an LSI chip even by state-of-the-art technologies.

BRIEF SUMMARY OF THE INVENTION

It is an object of the invention to provide an image segmentation method which can perform real time image segmentation on color and grayscale natural images and also which is suitable for realization by hardware and also to provide an image segmentation apparatus, an image processing method, and an image processing apparatus which utilities an architecture that is based on an algorithm which provides a basis for this image segmentation method.

According to an aspect of the invention, there is provided an image segmentation method which pinpoints one of the regions from an input image belonging to the same category and identifies the one region as an image segmentation region, the method comprising: a preparation step of including, an initialization step of putting, into a non-excitation state, a cell which is an individual image segmentation unit corresponding to pixels of the input image, a taking step of pixel values of the pixels corresponding to the cell, and calculating each coupling weight between a plurality of adjacent cells, and a determination step of leader cells (self-excitable cells candidate) based on each calculation result; a self-excitable cell detection step of selecting one of the leader cells determined by the determination step to detect the one cell as a self-excitable cell; a self-excitation step of putting, into an excitation state, the self-excitable cell detected in the self-excitable cell detection step; an excitable cell detection step of detecting an excitable cell from adjacent cells based on the coupling weights between the cells in the excitation state including the leader cell and the adjacent cells; an excitation step of putting, into an excitation state, the cells detected in the excitable cell detection step; and an inhibition step of putting, into an inhibition state, the cell in the excitation state if no cell is detected in the excitable cell detection step, wherein image segmentation of one region is completed by repeating the excitation until no cell is detected any more in the excitable cell detection step; and the image segmentation of all the regions is completed by repeating the respective steps until no leader cell in the non-excitation state is detected any more in the self-excitable cell detection step.

In the image segmentation method having this configuration, the image segmentation can be realized by simple processing and so can be performed in a very short processing time and also accompanied by a simple image segmentation unit (cell) which processes each pixel, so that it can be realized by hardware in a small area, thereby integrating a number of cells in one chip. Further, every cell operates in parallel with each other, thereby enabling increasing the speed of image segmentation even of an image having a large number of pixels. Further, it can be realized also as software, thereby enabling increasing the speed in an application that can be accommodated by the conventional software.

According to another aspect of the invention, there is provided an image segmentation apparatus which pinpoints one of the regions from an input image belonging to the same category and identifies the one region as an image segmentation region to selectively output an image of the arbitrary image segmentation region, the apparatus comprising: an input image memory which stores pixel values of the input image; a coupling weight calculation circuit which reads out the pixel values from the input image memory to calculate a coupling weight between each image segmentation cell corresponding to each pixel and the adjacent cell by pipeline processing; a leader cell determination circuit which determines, based on the coupling weights calculated by the coupling weight calculation circuit, as a leader cell, the cell in which a total sum of the coupling weights with the adjacent cells is in excess of a reference value; an image segmentation cell network having decision means in which there are alternately arranged in an array state the image segmentation cells which transit over a non-excitation state, a self-excitable state and an excitation state in accordance with each pixel of the input image and coupling weight registers which hold the inter-cell coupling weights obtained by the coupling weight calculation circuit, the decision means deciding whether each cell is excitable or not based on values held in the coupling weight registers in which the cells are arranged adjacent to each other, the decision means putting, into the excitation state, the leader cell determined by the leader cell determination circuit and putting, into the excitation state, the excitable cell selected from the adjacent cells to expand an excitation region, thereby deciding the image segmentation region; a segmentation region storage circuit which stores information of all the cells in the image segmentation region decided by the image segmentation cell network; and an output image memory which stores the pixel value corresponding to each cell in an arbitrary image segmentation region based on contents stored in the segmentation region storage circuit.

In the above configuration, an image segmentation architecture is realized as the image segmentation cell network by arranging the image segmentation units (cells) corresponding to the pixels and the coupling weight registers holding the inter-cell coupling weights alternately in an array, to provide a two-dimensional array structure and in a small area and so can be realized in an integrated circuit extremely easily.

As an application example of the invention, there are contemplated such an image processing method and an image processing apparatus as to be required to perform real time processing by use of the above configuration.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A shows the input image, and FIG. 1B shows the inter-cell coupling weights;

FIG. 5A, FIG. 5B, FIG. 5C and FIG. 5D are explanatory views of a coupling weight calculation circuit shown in FIG. 4, FIG. 5A shows its fundamental configuration, FIG. 5B shows a configuration of a grayscale image weight calculation circuit, FIG. 5C shows a configuration of a color image weight calculation circuit, and FIG. 5D shows an input/output example of an encoder;

FIG. 6A, FIG. 6B and FIG. 6C are explanatory views of a leader cell determination circuit shown in FIG. 4, FIG. 6A shows a calculation-subject cell, FIG. 6B shows a coupling weight data transferring order, and FIG. 6C shows a basic configuration example of the leader cell determination circuit;

FIG. 7 is a block diagram which shows a configuration example in a case where an input/output operation for the cell network is performed using a shift register in the image segmentation cell network shown in FIG. 4;

FIG. 9A and FIG. 9B are illustrations showing connection examples between cells and coupling weight registers used in FIG. 7 or 8, FIG. 9A shows a connection example with the horizontal coupling weight registers, and FIG. 9B shows a connection example with the vertical coupling weight registers;

FIG. 10 is a block diagram which shows a connection example between an arbitrary cell and four adjacent coupling-weight-register blocks in the same embodiment;

FIG. 12A and FIG. 12B are illustrations showing configuration examples of image segmentation cells in the same embodiment, FIG. 12A is a block diagram which shows a configuration in a case where addition and subtraction are performed in parallel with each other, and FIG. 12B is a block diagram which shows a configuration in a case where addition and subtraction are performed in serial with each other;

FIG. 15A to FIG. 15I are explanatory views of operations of an image segmentation algorithm in the same embodiment with reference to an execution example on 3×3 grayscale images;

FIG. 20A to FIG. 20D are illustrations respectively showing application examples of image segmentation on grayscale images in the same embodiment;

FIG. 21A to FIG. 21D are illustrations showing an application example of image segmentation on a color image in the same embodiment; and FIG. 22 is a characteristic graph which shows a simulation result of the image segmentation time in a case where the image segmentation algorithm of the same embodiment is realized by hardware.

DETAILED DESCRIPTION OF THE INVENTION

The following will describe in detail embodiments of the invention with reference to drawings.

A. Configuration of Image Segmentation Algorithm (Method)

The following will describe an image segmentation algorithm to realize image segmentation according to an embodiment related to the invention.

To realize the image segmentation algorithm based on the above-mentioned LEGION model by D. L. Wang directly by software, it is necessary to solve a plurality of differential equations for each pixel. Therefore, it cannot easily be applied to a case where real time processing is required. Further, to realize it by hardware in order to increase the processing speed, an attempt to directly realize the algorithm by hardware gives rise to complicated and large scale hardware required to solve the differential equations. Therefore, it is considered to be extremely difficult to realize a large scale cell network on one chip.

Therefore, the present embodiment proposes an image segmentation algorithm that can realize required hardware by a digital circuit capable of high speed processing rather than realizing the LEGION model directly by hardware. This algorithm features that a behavior of the cell network is interpreted by paying attention to a respect that a cell corresponding to each pixel can be handled in a non-excitation state, a self-excitable state, and an excitation state.

Figure 1A:
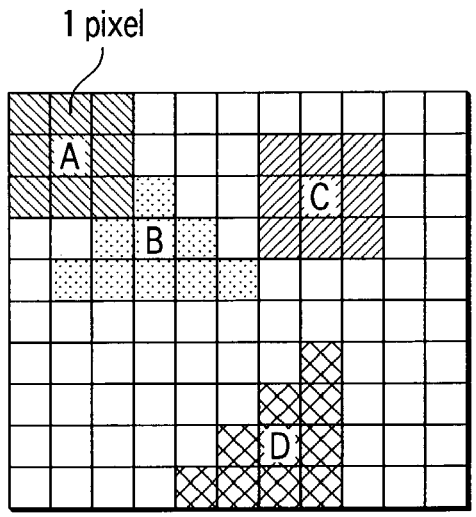
FIG. 1A and FIG. 1B are explanatory views of an input image and an inter-cell coupling weight in an embodiment of the invention.
Figure 1B:
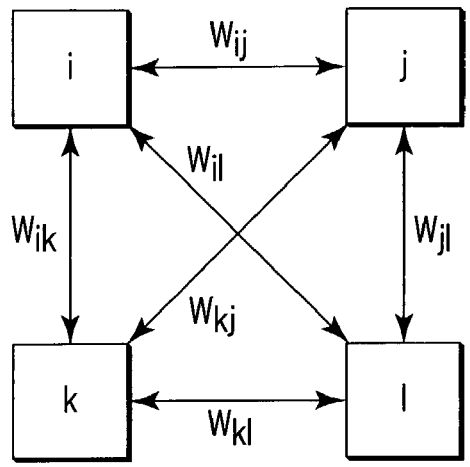

It is to be noted that, as shown in FIG. 1A and 1B, each cell corresponds to one pixel of an input image, so that, for example, a coupling weight $W_{ij}$ between the cells i and j is calculated using values of the corresponding pixels. FIG. 1A shows one example of the input image, in which one cell corresponds to one pixel and reference symbols A-D indicate image segmentation regions. FIG. 1B shows inter-cell coupling weights and reference symbols i, j, k, and l indicate the cells that correspond to the pixels and reference symbols $W_{ij}$, $W_{ik}$, $W_{il}$, $W_{kj}$, $W_{kl}$, and $W_{jl}$ indicate the inter-cell coupling weights.

Figure 2:
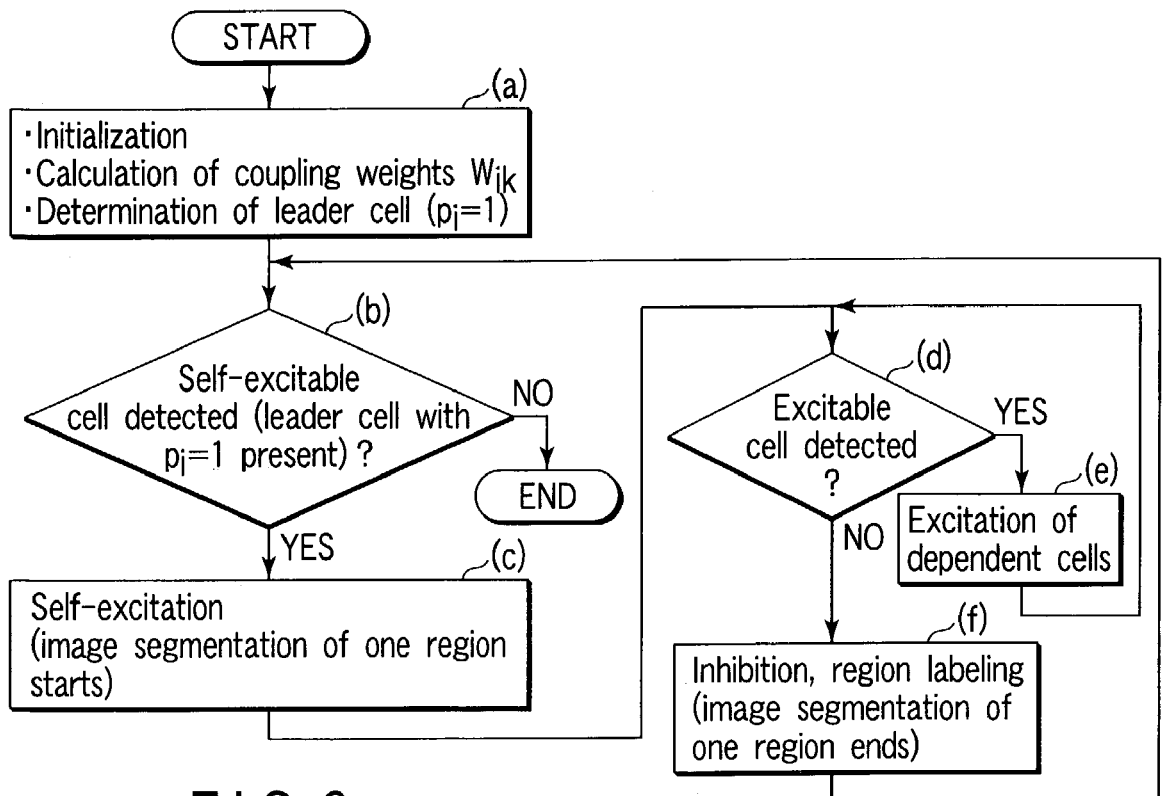
FIG. 2 is a flowchart which shows a flow of processing of an image segmentation algorithm in the same embodiment.

FIG. 2 is a flowchart which shows a processing procedure of the image segmentation algorithm. This image segmentation algorithm is composed of six processing steps of (a) initialization, (b) self-excitable cell detection, (c) self-excitation, (d) excitable cell detection, (e) excitation of dependent cells, and (f) inhibition. According to this algorithm, each cell which corresponds to each pixel enters the non-excitation state, the self-excitable state, and the excitation state and operates in parallel with each other based on the coupling weights between the adjacent eight pixels.

Figure 3:
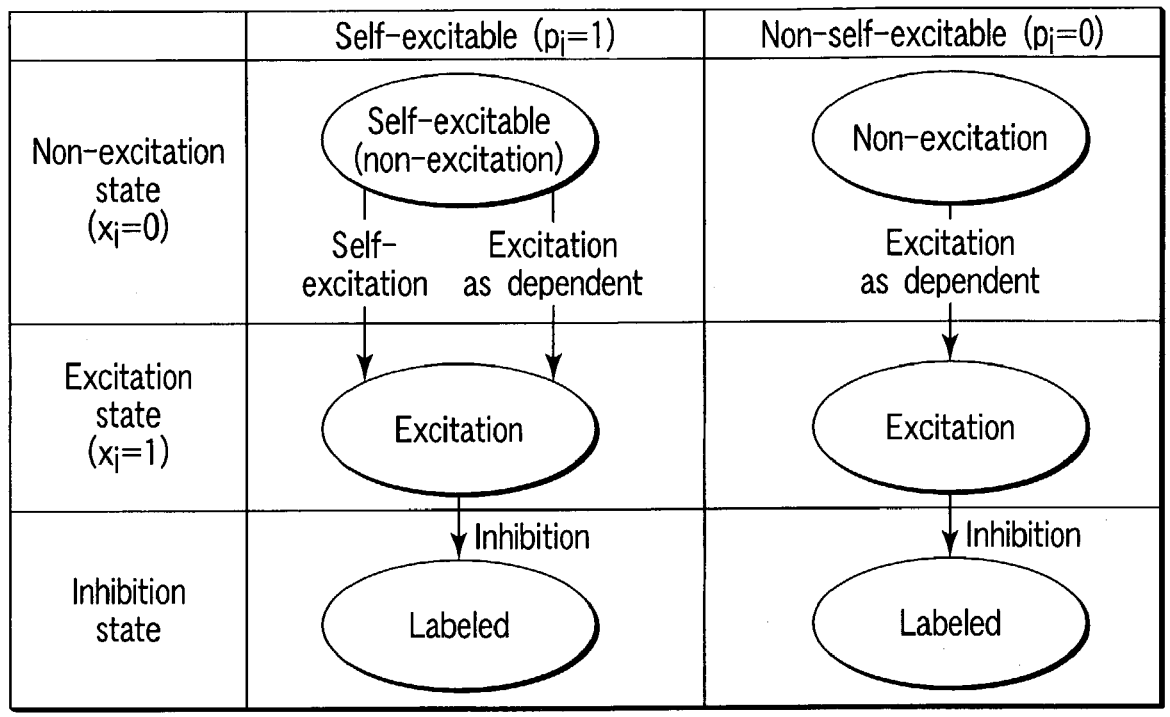
FIG. 3 is a table which shows a cell state transition in the same embodiment.

FIG. 3 shows the cell state transition. In FIG. 3, a variable $x_i$ represents whether the cell i is in the excitation state or the non-excitation state: $x_i=1$ indicates the excitation state and $x_i=0$ indicates the non-excitation state. Further, a variable $p_i$ represents whether the relevant cell is self-excitable or not. $p_i=1$ indicates that the cell is leader cell and so becomes a self-excitable cell candidate. The image segmentation algorithm of the present embodiment decides whether the cell of interest belongs to the same image segmentation region as the leader cell based on the excitation or non-excitation state.

The following will describe the processing procedure shown in FIG. 2.

At "initialization" of step (a), the process once initializes each cell i into the non-excitation state. Then, the process calculates each inter-cell coupling weight $W_{ik}$ between the cell i and its adjacent eight cells k and, based on these calculated inter-cell coupling weights, determines the self-excitable cells (which are referred to as leader cells) $p_i=1$. At "self-excitable cell detection" of step (b), the process selects one leader cell ($p_i=1$) yet to be excited as the self-excitable cell. At "self-excitation" of step (c), the process puts this selected leader cell into the excitation state. At "excitable cell detection" of step (d), the process selects the excitable cells based on the states of the adjacent eight neighboring cells and the inter-cell coupling weights. At "excitation of dependent cells" of step (e), the process puts the cells selected at step (d) into the excitation state.

The process repeats these operations until no excitable cell is selected any more. If there is no excitable cell any more, the process performs "inhibition, region labeling" of step (f), thereby completing the image segmentation of one region. The process repeats these operations until there is no non-excited leader cell any more, thereby completing the image segmentation of the image as a whole.

The following will describe details of each processing of steps (a) through (f) described above.

At the "initialization" of step (a), the process initializes the variable $x_i$ that indicates whether the cell i is in the excitation or non-excitation state, into $x_i=0$ (non-excitation). The process calculates the coupling weights $W_{ik}$ based on the pixel values of the cells $k \in N(i)$ which are adjacent to the cell (pixel) i.

The N(i) represents a set of the cells adjacent to the cell i (for example, a set of the adjacent eight cells). For example, for a grayscale image, the coupling weight $W_{ik}$ is represented by the following equation (1):

$$W_{ik}=I_{max}/(1+|I_i-I_k|), k \in N(i) \quad (1)$$

where $I_i$ and $I_k$ indicate a brightness value of the pixels i and k respectively and $I_{max}$ indicates the maximum value of the pixel brightness value and becomes $I_{max}=255$ if the brightness value is represented in eight bits.

In the case of segmenting a color image, color information can be used to improve the accuracy of image segmentation. Since the algorithm of the present embodiment makes transition over the cell states by the coupling weights between the adjacent cells (pixels), for example, coupling weights $W(R)_{ik}$, $W(G)_{ik}$, and $W(B)_{ik}$ for the respective red (R), green (G), and blue (B) colors are calculated by the following equations (2):

$$W(R)_{ik}=I(R)_{max}/(1+|I(R)_i-I(R)_k|),$$

$$W(G)_{ik}=I(G)_{max}/(1+|I(G)_i-I(G)_k|),$$

$$W(B)_{ik}=I(B)_{max}/(1+|I(B)_i-I(B)_k|) \quad (2)$$

By calculating an equation (3) based on a calculation result of the equations (2), the inter-cell coupling weight $W_{ik}$ is determined. It is thus possible to realize more accurate image segmentation.

$$W_{ik}=\min\{W(R)_{ik}, W(G)_{ik}, W(B)_{ik}\} \quad (3)$$

Next, the process decides whether the cell of interest is a leader cell (self-excitable cell candidate) or not based on the inter-cell coupling weights. If a total sum $\Sigma_{k \in N(i)}W_{ik}$ of the coupling weights of all the cells adjacent to the cell of interest is larger than a predetermined threshold value $\phi_p$ ($\Sigma_{k \in N(i)}W_{ik}>\phi_p$), the process sets the variable $p_i$ that indicates whether self-excitation is permitted or not permitted to $p_i=1$, to determine the cell of interest to be a self-excitable leader cell. If it is not larger than that ($\Sigma_{k \in N(i)}W_{ik} \leq \phi p$), the process initializes the variable in $p_i=0$ (non-self-excitable). The leader cell becomes a candidate of a starting point for the subsequent processing of image segmentation.

Finally, the process initializes a variable z (which is referred to as a global suppressor) which decides whether there is an excited cell or not, in z=0. If z=1, it indicates that there is an excited cell, that is, one region is continuously undergoing image segmentation. If z=0, it indicates that there is no excited cell any more, that is, one region is completed in image segmentation. For each cell i, a variable $z_i$ is provided which indicates whether the state is changed or not, so that only when the cell has transited from the non-excitation state to the excitation state, $z_i=1$ is set and, otherwise, $z_i=0$ is set. Based on this variable $z_i$, the value of the global suppressor z is defined to be $z=V_{\forall i}z_i$ as a logical sum of all $z_i$ values. In this case, V indicates a logical sum (OR) operator.

At "self-excitable cell detection" of step (b), the process selects one leader cell (self-excitable cell candidate) yet to be excited, that is, the one that satisfies conditions ($x_i=0 \land p_i=1$). In this case, $\Lambda$ indicates a logical product (AND) operator.

At "self-excitation" of step (c), the process sets this selected leader cell into the excitation state $x_i=1$ (self-excitation), to start image segmentation on one region. In this case, $z_i=1$ is set.

At "excitable cell detection" of step (d), the process checks the excitation state of the cells $k \in N(i)$ adjacent to the non-excited cell i and calculates a total sum $S_i=\Sigma_{k \in N_j}(i) \Lambda xk=1 W_{ik}$ of the coupling weights of the cells in the excitation state. If the cells $k \in N(i)$ are in the excitation state, that is, $x_k=1$, the process adds a coupling weight between the cell of interest and the adjacent excited cell k to $S_i$. If this total sum $S_i$ of the coupling weights is larger than the predetermined threshold value $\phi z$ ($S_i>\phi z$), the cell i becomes an excitable cell.

At "excitation of dependent" of step (e), the process sets all the excitable cells i detected at "excitable cell detection" of step (d) into the excitation state $x_i=1$ and, at the same time, sets $z_i=1$. Further, the process sets the state variable $z_i=0$ (no state change) for the cells i which are already into the excitation state ($x_i=1$ and $z_i=1$) other than those cells that have been excited at the processing of "excitation of dependent".

If there is no excitable cell present, the process executes "inhibition" of step (f). In this processing of "inhibition", $x_i=0$ and $z_i=0$ are set for the cell i in the excitation state and if $p_i=1$, $p_i=0$ is set. Thus, one region is completed in image segmentation.

Subsequently, the process returns to "self-excitable cell detection" of step (b), to shift to image segmentation of the next region, thereby repeating the processing items described above. If no self-excitable cell yet to be excited is detected any more in the processing of "self-excitable cell detection" of step (b), the process decides that all the regions are completed in image segmentation.

The following describes an example of the image segmentation algorithm of the present embodiment. All the cells execute the following algorithm in parallel with each other. It is to be noted that a function of find_leader( ) in the algorithm retrieves a leader cell yet to be excited and returns its cell number. If there is no such cell present, it returns a negative numeral. Further, the variables $x_i$, $z_i$, and z vary as time passes by, so that at moments t and t+1, the value of $x_i$ is to be represented in the forms of $x_i(t)$ and $x_i(t+1)$ respectively.

[Image Segmentation Algorithm]
1. Initialization
   1. Initialization of global inhibitor $z(0)=0$;
   2. Calculation of coupling weights with adjacent neighboring eight cells
      (a) In the case of grayscale image $W_{ik}=(I_{max})/(1+|I_i-I_k|)$, $k \in N(i)$;

(b) In the case of color image $W(R)_{ik}=(I(R)_{max})/(1+|I(R)_i-I(R)_k|)$, $W(G)_{ik}=(I(G)_{max})/(1+|I(G)_i-I(G)_k|)$, $W(B)_{ik}=(I(B)_{max})/(1+|I(B)_i-I(B)_k|)$, $W_{ik}=\min\{W(R)_{ik}, W(G)_{ik}, W(B)_{ik}\}$.
   3. Determination of leader cells if $(\Sigma_{k \in N(i)}W_{ik}>\phi_p)$ then $p_i=1$; otherwise $p_i=0$;
   4. Put all cells in non-excitation state $x_i(0)=0$;
2. Self-excitation
   if (there is no excitable cell present) then stop;//terminate
   else if (find_leader( )==i$\land$$p_i$=1) then $x_i(t+1)$=12, $z(t+1)$=1, go to
   (3. Excitation)//self-excitation else go to (2. Self-excitation);
3. Excitation of dependent cells
   Setting of global inhibitor $z(t)=V^{\forall i}z_i(t)$;//$z_i$'s logical or
   if($z(t)$==0) then//there is no excited cell present if($x_i(t)$==1)then
       $x_i(t+1)$=0, $z_i(t+1)$=0, $p_i$=0;//inhibition go to (2. Self-excitation);
   else if $(x_i(t)$==$0 \land z_i(t)$==$0)$then//non-excitation $S_i(t)=\Sigma_{k \in N(i)}(W_{ik} \times x_k(t))$;
   if($S_i(t)>\phi_z$)then $x_i(t+1)$=1;$z_i(t+1)$=1;//excitation
   else $x_i(t+1)$=0;$z_i(t+1)$=0;//non-excitation
   else if($x_i(t)$==$1 \land z_i(t)$==1) then $x_i(t+1)$=1; $z_i(t+1)$=0;
   go to (3. Excitation of dependent cells);

This image segmentation algorithm of the present embodiment has the following features.

(1) The algorithm can be realized by simple processing, so that an image can be segmented in a very short processing time.

(2) Furthermore, an element (cell) to be processed for each pixel is simplified, so that the algorithm can be realized by hardware in a small area, thereby integrating the many cells on one chip.

(3) Further, the cells all operate in parallel, to make it possible to increase the speed of image segmentation processing on an image having a large number of pixels.

(4) The algorithm can be realized also as software, so that high speed processing is possible even in an application that can be accommodated by conventional software.

Figure 4:
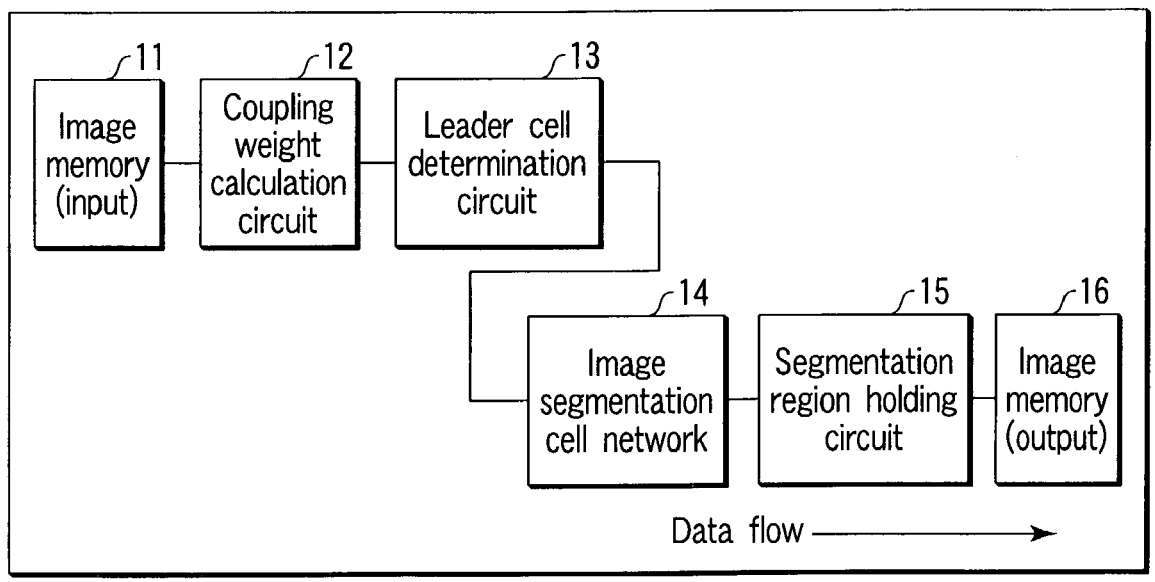
FIG. 4 is a block diagram which shows a hardware configuration example of an image segmentation apparatus in the same embodiment.

B. Image Segmentation Architecture (Apparatus) and Integrated Circuit Configuration The image segmentation algorithm can be realized as hardware by using a digital circuit. FIG. 4 shows a block diagram of an architecture that realizes this algorithm by the digital circuit as an embodiment of an image segmentation apparatus related to the present embodiment.

In FIG. 4, first, brightness values (hereinafter referred to as pixel values) $I_i$ of an image are read out in order from an input image memory 11, to calculate the coupling weights $W_{ik}$ at a coupling weight calculation circuit 12. Based on the coupling weights calculated at the coupling weight calculation circuit 12, a leader cell determination circuit 13 determines leader cells (decision of whether $\Sigma_{k \in N(i)}W_{ik}>\phi_p$ is established). In such a manner, pipeline processing is executed on each pixel i of the input image, to transfer data of the calculated $W_{ik}$ and $p_i$ to a cell network 14 which executes image segmentation. The cell network 14 performs the operations given by the algorithm concurrently on the respective pixels (cells) to segment the image. A result of this image segmentation is passed through a segmentation region storage circuit 15 and is output to an output image memory 16.

The following will describe details of each block.

[Coupling Weight Calculation Circuit 12]

A configuration of the coupling weight calculation circuit 12 is described with reference to FIGS. 5A, 5B, 5C, and 5D. FIG. 5B shows a basic configuration of a circuit which calculates the coupling weights by the pipeline processing. In this figure, the pixel values $I_i$, $I_{i-1}$, ..., $I_j$, $I_{j-1}$, ..., and $I_k$, $I_{k-1}$, ... given in three vertically consecutive rows y−1, y, and y+1 in the image memory are input in order from the left side in the figure.

The pixel values of each of these rows are sent to a data selection circuit 122 both via a register 121 which delays the values by one pixel and directly. Based on a control signal, the data selection circuit 122 selectively transfers each two pixel values necessary to calculate the coupling weights between the relevant pixels (cells), to each of four weight calculation circuits 123.

The weight calculation circuit 123 calculates the coupling weight $W_{ik}$ based on the two pixel values $I_i$ and $I_k$ and transfers a calculation result to the leader cell determination circuit 13 and the cell network 14 in order.

FIGS. 5B and 5C show examples of the weight calculation circuit 123 for a grayscale image and a color image respectively. In FIGS. 5B and 5C, a reference numeral 123A indicates an absolute value calculation circuit, a reference numeral 123B indicates an encoder, and a reference numeral 123C indicates a minimum value determination circuit.

Although a value of:

$$W_{ik}=I_{max}/(1+|I_i-I_k|), k \in N(i)$$

can be calculated directly for the grayscale image, a hardware quantity of a division circuit becomes large. In place of doing so, therefore, the weight calculation circuit 123 of the present embodiment uses the encoder 123B which executes encode processing such as shown in FIG. 5D, thereby encoding an eight-bit output of the absolute value calculation circuit 123A into a three-bit output. It is thus possible to decrease the area required in the case where the hardware configuration is employed.

In the case of the color image, three data pieces $I(R)_i$, $I(G)_i$, and $I(B)_i$ of R, G, and B colors are sequentially transferred from the left side in the figure to calculate $W(R)_{ik}$, $W(G)_{ik}$, and $W(B)_{ik}$, minimum value $(W_{ik}=\min\{W(R)_{ik}, W(G)_{ik}, W(B)_{ik}\})$ are selected by the minimum value determination circuit 123C in FIG. 5C, and the value of $W_{ik}$ is transferred to the leader cell determination circuit 13 and the cell network 14, thereby enabling the realization.

It is to be noted that as for the calculated coupling weight values, values beforehand calculated by software may be given as the input data.

[Leader Cell Determination Circuit 13]

The following will describe a fundamental configuration of the leader cell determination circuit 13 with reference to FIGS. 6A, 6B and 6C. This leader cell determination circuit 13 calculates a total sum of the coupling weights of the adjacent eight neighboring cells, based on a calculation result of the coupling weight calculation circuit 12, and decides whether the total sum is larger than a predetermined threshold value $\phi_p$ (decision of whether $\Sigma_{k \in N(i)} W_{ik} > \phi_p$ is established). If such is the case, the circuit 13 outputs $p_i=1$ and, otherwise, outputs $p_i=0$. The output value is transferred to the cell network 14, to be shifted through all of the cells starting from the leftmost row in order in a $p_i$ register of each image segmentation cell as a shift register, thereby setting $p_i$ for each cell.

In the case of, for example, deciding whether an image segmentation cell $P_5$ shown in FIG. 6A is a leader cell or not, results calculated by the coupling weight calculation circuit 12 as shown in FIG. 6B are input in order to input terminals $IN_1$-$IN_3$ of the leader cell determination circuit 13 having a configuration shown in FIG. 6C.

This leader cell determination circuit 13 adds the coupling weight values input through the terminals $IN_1$ and $IN_3$ at a first adder 131 and adds this addition result to the coupling weight value input through the terminal $IN_2$ at a second adder 132. This addition result is adjusted in timing at a first register 133 and, at the same time, added to an output value of the first adder 131 at a third adder 134. This addition result of the third adder 134 is adjusted in timing at a register 135 and, at the same time, added to an output value of the second adder 132 at a fourth adder 135. Finally, the addition result of the fourth adder 135 is sent to a comparator 137, which compares it to the threshold value $\phi_p$ and, if it is larger than the threshold value $\phi_p$, determines $P_5$ as the leader cell and sets the value of pi to 1.

Although this example has been described with reference to the cell $P_5$, the corresponding coupling weight values can be given in order to the cells respectively, to enable the pipeline processing. Therefore, the calculated results are transferred to the cell network 14. In the cell network 14, the $p_i$ register constitutes a shift register. Therefore, by using the shift register, it is possible to transfer data to all of the cells.

Figure 8:
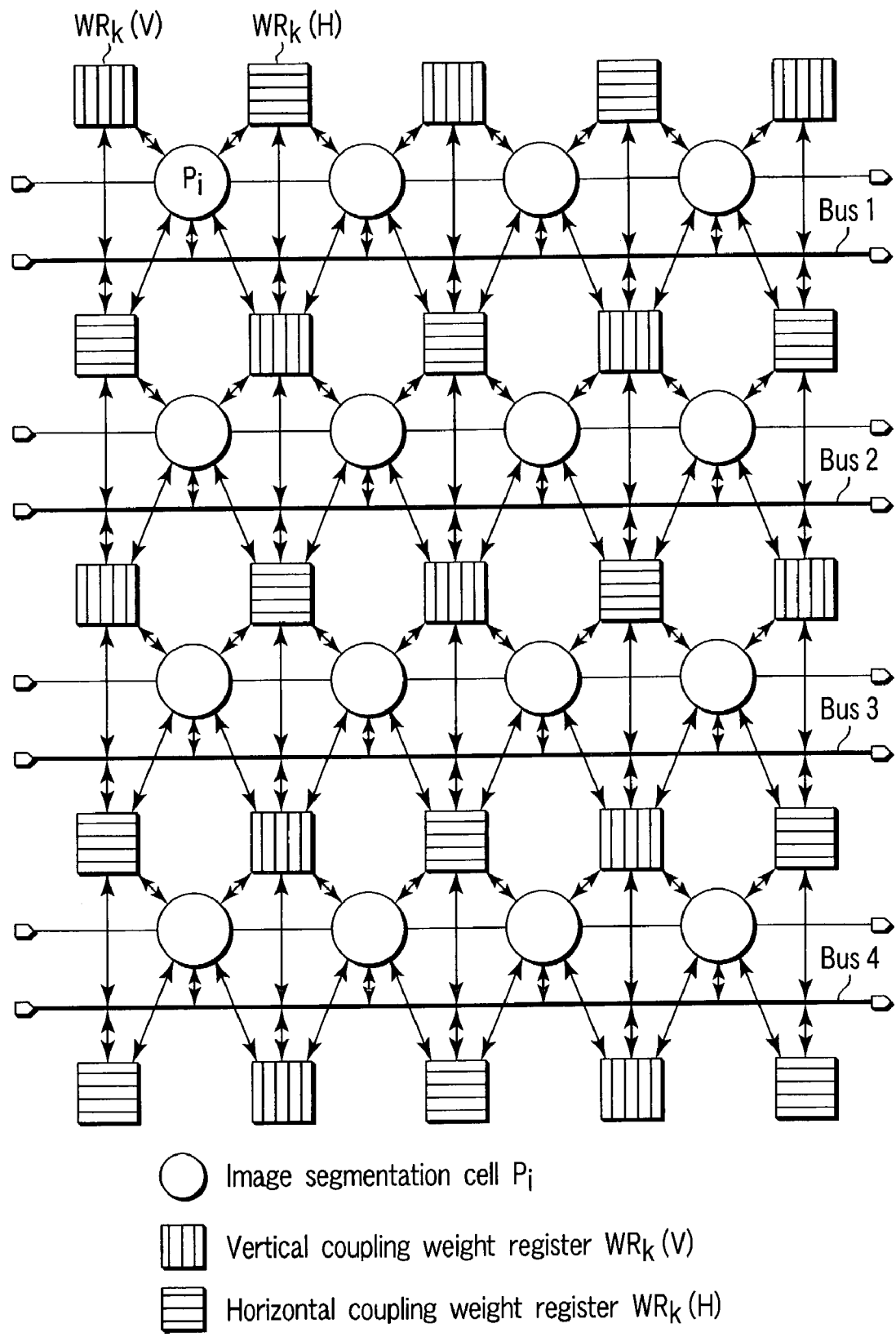
FIG. 8 is a block diagram which shows a configuration example in a case where an input/output operation for the cell network is performed using a bus in the image segmentation cell network shown in FIG. 4.

It is to be noted that in the case of a structure having a later-described bus such as shown in FIG. 8, it is also possible to transfer data directly to the relevant cell by the bus. Further, in calculation of such a leader cell, as in the case of calculation of the coupling weight, it is also possible to give a value beforehand calculated by software as the input data.

[Image Segmentation Cell Network 14]

FIGS. 7 and 8 show configuration examples of the cell network 14 which execute the respective image segmentation processes. In the image segmentation algorithm of the present embodiment, the state to which each cell transits is determined on the basis of the states of the adjacent eight cells and the corresponding coupling weights. Therefore, the cell network 14 is realized by arranging an image segmentation cell $P_i$ which corresponds to each pixel and a coupling weight register $WR_k$ which registers a coupling weight between the adjacent cells alternately with each other in an array.

FIG. 7 is a block diagram which shows a configuration example in a case where data of the cell network 14 is input/output using a shift register. In FIG. 7, $P_i$ indicates the image segmentation cell, $WR_k(V)$ indicates a vertical coupling weight register, and $WR_k(H)$ indicates a horizontal coupling weight register. The coupling weight $W_{ik}$ and other data such as $x_i$ are transferred between the cells and the coupling weight registers through a local wiring line indicated by an arrow. Further, in order to input/output data to/from the network data is similarly transferred also between the adjacent cells and between the adjacent coupling weight registers through the local wiring line.

FIG. 8, on the other hand, is a block diagram which shows a configuration example in a case where the data is input to and output from the cell network 14 through a bus. In FIG. 8, $P_i$ indicates the image segmentation cell, $WR_k(V)$ indicates the vertical coupling weight register, and $WR_k(H)$ indicates the horizontal coupling weight register. In order to improve parallel processing, the coupling weight $W_{ik}$ and other data such as $x_i$ are transferred to the cells and the coupling weight registers a bus to which the local wiring indicated by the arrow is connected.

There are two kinds of coupling weight registers $WR_k$: the horizontal coupling weight register $WR_k(H)$ shown in FIG. 9A and the vertical coupling weight register $WR_k(V)$ shown in FIG. 9B. The horizontal coupling weight register $WR_k(H)$ holds four coupling weight values related to the diagonal and horizontal pixels, while the vertical coupling weight register $WR_k(V)$ holds four coupling weight values related to the diagonal and vertical pixels. In FIGS. 8 and 9, an arrow in each of the coupling weight registers schematically indicates a positional relationship between the inter-cell coupling weights which are held.

As shown in FIGS. 7 and 8, these coupling weight registers $WR_k(H)$ and $WR_k(V)$ are each arranged between the image segmentation cells Pi in such a manner that they may alternate. By arranging them in such a manner, they can each share the same coupling weight between themselves and the adjacent cell $P_i$. Further, it is possible to reduce the length of the wiring line between the cell $P_i$ and each of the coupling weight registers $WR_k(H)$ and $WR_k(V)$. Furthermore, by causing an external coupling weight calculation circuit to beforehand calculate the coupling weight value between the adjacent pixels to be held in the coupling weight register $WR_k(H)$ or $WR_k(V)$, the image segmentation cell $P_i$ need not perform the calculation. It is thus possible to simplify the structure of the individual cell $P_i$, thereby decreasing its area and increasing its operating speed.

FIG. 10 shows a connection between the image segmentation cell and the adjacent coupling weight register. In this figure, the connection related to $P_5$ is shown by a bold line.

[Coupling Weight Register $WR_k$]

Figure 11:
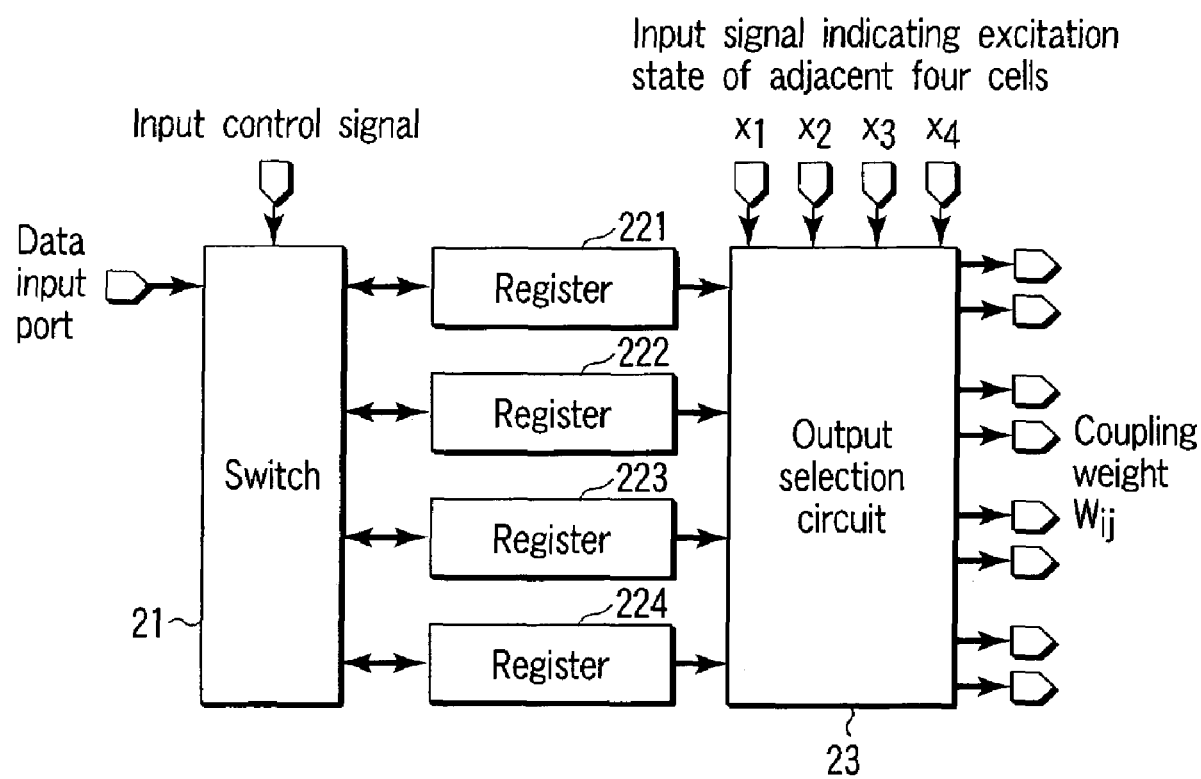
FIG. 11 is a block diagram which shows a configuration example of a coupling-weight-register block containing four coupling-weight-registers, in the same embodiment.

FIG. 11 shows a configuration example of the coupling weight resistors $WR_k$. The coupling weight registers $WR_k$ are classified into two kinds: a vertical coupling type and a horizontal coupling type. Both of them have the same fundamental internal structure but are identified as the vertical coupling type if the coupling weights held in the register include an inter-vertical-cell coupling weight, and as the horizontal coupling type if they include an inter-horizontal-cell coupling weight.

As shown in FIG. 11, the coupling weight register $WR_k$ is provided therein with a switch 21 which switches a coupling weight value input from a data input port into four output systems based on the input control signal, four registers 221-224 which hold the respective coupling weight values given from the switch 21, and an output selection circuit 23 which transfers the coupling weight values to the adjacent image segmentation cells. The coupling weight value takes on a value of 0-255 in the case where the pixel value is represented in eight bits and so needs to have eight bits typically. The number of the coupling weight registers, however, is proportional to the number of the pixels. Therefore, the eight-bit coupling weight value is encoded into a three-bit one and held in the register 221-224. It is thus possible to reduce the bit width of the wiring line required to transfer data to the image segmentation cells from each of the coupling weight registers, thereby decreasing the required area.

The output selection circuit 23 of FIG. 11 selects and outputs either one of the four coupling weight values respectively held in registers 221-224 based on the signals $x_i$ (excitation state: $x_i=1$, non-excitation state: $x_i=0$) which indicates the excitation or non-excitation state of the adjacent four cells Pi (i=1–4). If, for example, the cell P5 is excited ($x_i=1$) as shown in FIG. 10, it outputs a coupling weight (portion connected with a bold line in the figure) obtained from the pixel that corresponds to the cell P5. If the cell P5 is not excited ($x_i=0$), on the other hand, it outputs 0.

[Image Segmentation Cell $P_i$]

Configuration examples of the image segmentation cell $P_i$ are shown in FIGS. 12A and 12B. The image segmentation cell $P_i$ transits over the "non-excitation", "self-excitable", and "excitation" states in accordance with the image segmentation algorithm (FIG. 2).

In the image segmentation cell Pi shown in FIG. 12A, the process stores the signal $x_i$ (one bit) which indicates the excitation state and the variable $P_i$ (one bit) which indicates permission/non-permission of self-excitation in registers 31 and 32 respectively. Further, the process inputs the coupling weights $W_{ik} \times x_i$ which each are encoded into three-bit ones between the eight neighboring cells, decodes them by a decoder 33, calculates a total sum of the coupling weights $S_i(t)$ $(=\Sigma_{k \in N(i)} (W_{ik} \times x_k(t)))$ by an adder 34, and subtracts the threshold value $\phi_z$ which decides "self-excitable" from the total sum $S_i(t)$ (11 bits) by a subtractor 35. At the subtractor 35, the process decides whether $S_i(t)-\phi_z > 0$ and outputs a symbol which indicates a decision result to a control circuit 36.

It is to be noted that FIG. 12A shows the configuration example in a case of realizing by parallel processing the adder 34 which calculates the total sum $S_i$ which decides the excitable state in the image segmentation cell, whereas, as shown in FIG. 12B, such a configuration is possible that a control circuit 37 may conduct control over a switch 38 in input selection. In the image segmentation cell $P_i$ in this case, when the switch 38 operates to switch an input, the process sequentially and selectively inputs the coupling weights $W_{ik} \times x_i$ which are each encoded into the three-bit ones between the eight neighboring cells and the threshold value $\phi_z$ which decides the "self-excitable" state. The process decodes a selection result into eight-bit data by a decoder 39 and executes additions and subtractions serially by a serial adder/subtractor 40 and a register 41.

That is, in the case of the configuration shown in FIG. 12A, additions and subtractions are executed in parallel with each other, so that the operating speed can be increased. This configuration, however, requires eight adders and subtractors, so that the cell area increases as a whole. The configuration shown in FIG. 12B, on the other hand, requires only one adder/subtractor, so that the cell area decreases. However, the time required for each addition/subtraction is increased from one cycle to nine cycles, so that the total processing time becomes longer than in the case of parallel addition/subtraction. Thus, the configuration of FIG. 12A and that of FIG. 12B are in a trade-off relationship. These configurations, therefore, are used properly in accordance with whether the higher-speed or the smaller area is more important than the other in use.

Figure 13:
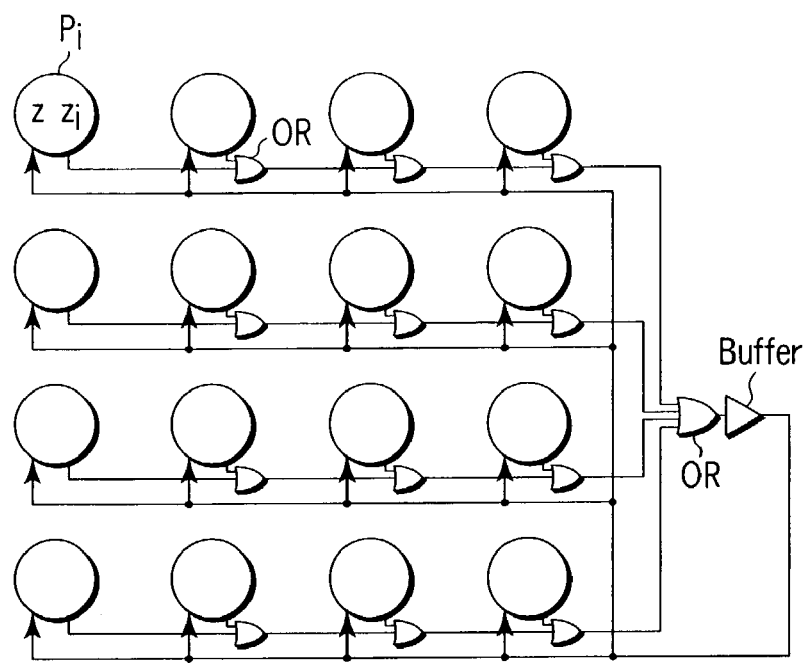
FIG. 13 is a block diagram which shows a connection example of global suppressors in the same embodiment.

The output signal $x_i$ of the control circuit 36 or 37 is sent to an adjacent coupling weight register. Further, the output signal $z_i$ is used in calculation of the global suppressor z $(z(t)=V_{\forall i}z_i(t))$ FIG. 13 shows a connection example of the global suppressors. As shown in FIG. 13, the output signal $z_i$ of each cell $P_i$ is OR-tied with the output $z_i$ of the adjacent cells, and each row is OR-tied with the next row, thereby resulting in the overall global suppressor z. This signal z is fed back to the control circuit 36 and 37 of each cell via a buffer circuit. In the case of a configuration in which the bus of FIG. 8 is used, the signal z can be supplied to each cell by utilizing the bus.

Figure 14:
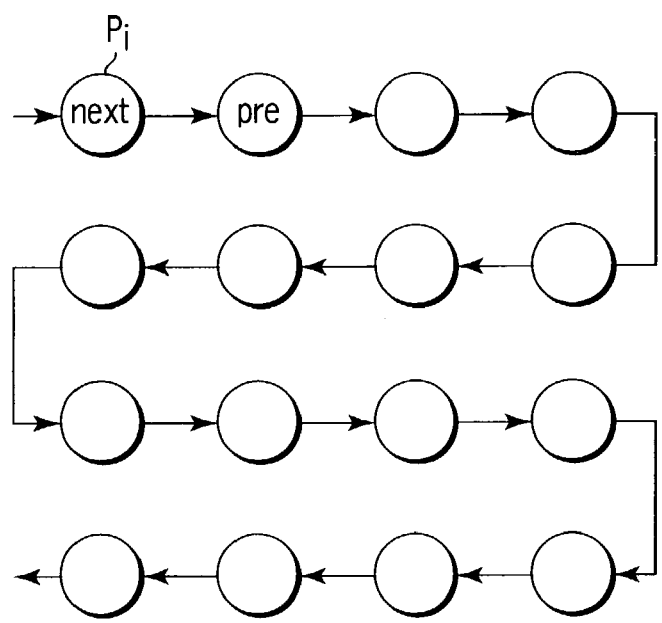
FIG. 14 is a conceptual diagram which shows how non-excited leader cells are sequentially searched by a self-excitation permission signal and a self-excitable cell is detected from among the leader cells in the same embodiment.

Further, a "next" signal becomes an input signal "pre" for the adjacent image segmentation cells shown in FIGS. 7 and 8. This "next" signal is used to realize the find_leader( ) function of the image segmentation algorithm, that is, to control the order in which the leader cells (self-excitable cells candidate) are to be excited. For example, a "next" signal output terminal and a "pre" signal input terminal are sequentially connected between the adjacent cells as shown in FIG. 14. Each of the cells is self-excitable when the input signal "pre" is set to pre=1 and $p_i=1$. Therefore, in this configuration, control can be conducted so that the cells that have the setting of $p_i=1$ and are in the non-excitation state may become the leader cell in an order starting from the left top cell.

[Segmentation Region Storage Circuit 15]

Information of one region which has been subject to image segmentation can be detected if the value of $x_i$ of each cell is set to 1 ($x_i=1$). In the case of the embodiment shown in FIG. 7, the $x_i$ register of each cell $P_i$ is connected between the adjacent cells in each row, thereby constituting the row-specific shift register. Therefore, the segmentation region storage circuit 15 arranged on the output side receives data held in the $x_i$ register from the cells in each column, to store the information of all the cells. It is thus possible to store the information of each of the regions which have been subject to image segmentation. In the case of the embodiment shown in FIG. 8, the same operations can be realized by utilizing the bus.

C. Actions of Image Segmentation Algorithm (Method)

The following will describe operations of the image segmentation algorithm in the present embodiment in an example of 3×3 grayscale images with reference to FIGS. 15.

By the operations of the algorithm of this example, as shown in FIGS. 15A-15I, a segmentation region is grown on the basis of the following coupling weights based on the pixel values of the eight pixels k∈N(i) adjacent to the pixel i:

$$W_{ik}=I_{max}/(1+|I_i|I_k|), k \in N(i)$$

where $I_{max}$ is the maximum value of the brightness value of the pixel. The cell corresponding to each pixel becomes a leader cell (self-excitable cell candidate, $p_i=1$) if the total sum $\Sigma_{k \in N(i)} W_{ik}$ of the coupling weights between itself and the cells that correspond to the adjacent eight pixels is larger than the threshold value $\phi_p$. In this example, as shown in FIG. 15C, two leader cells are present and so subject to self-excitation in an order starting from the upper left side. The leader cell provides a starting point candidate of image segmentation.

First, at initialization (step (a) of FIG. 2), all of the cells are each subject concurrently to calculation of the coupling weight $W_{ik}$ between each of themselves and the adjacent eight neighboring cells k∈N(i), to determine the leader cells ($p_i=1$ for the leader cell and $p_i=0$ for the others). Next, if there are any leader cells ($p_i=1$) present (step (b) of FIG. 2), one of them starts self-excitation (region segmentation), to expand segmentation regions starting from the leader cell (FIG. 15E).

Each cell i is subject to calculation of a total sum:

$$\Sigma_{k \in N(i) \wedge x k=1} W_{ik}$$

between itself and the cells k∈N(i) that correspond to the adjacent eight neighboring pixels if they are in the excitation state ($x_k=1$) and, if this total sum is larger than the threshold value $\phi_z$, is excited ($x_i=1$) automatically (steps (d) and (e) of FIG. 2). These operations are performed concurrently on all the cells until there is no cell which is excited any more. If there is no cell newly excited any more, the process performs inhibition ($x_i=0$, $z_i=0$, and $p_i=0$) (step (f) of FIG. 2). In this example, there is no excitable cell any more as shown in FIG. 15G, and segmentation of the white regions ends.

This one series of steps completes segmentation of one region. This series of steps is repeated until there is no non-segmented leader cell any more. In the example, gray region segmentation starts from the left bottom leader cell as shown in FIG. 15H and, upon completion of the segmentation, ends as shown in FIG. 15I.

Figure 16A:
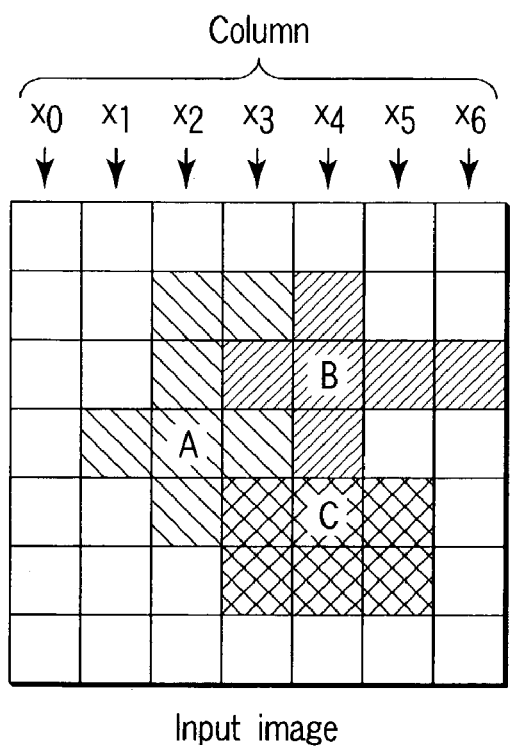
FIG. 16A to FIG. 16D are explanatory views of operations of an image segmentation architecture in the same embodiment with reference to an execution example on 7×7 images.

D. Actions of Image Segmentation Architecture (Apparatus) and Integrated Circuit An architecture in an image segmentation apparatus of the present embodiment has fundamentally the same operations as those of the image segmentation algorithm. Hereinafter, description is made with reference to an example where there are three regions of A, B, and C in an image consisting of 7×7 pixels as shown in FIG. 16A. Although, normally, a region that corresponds to the background other than the regions A, B, and C is also segmented as one region, this region is supposed to have no leader cell therein for simplicity in explanation.

Figure 16B:
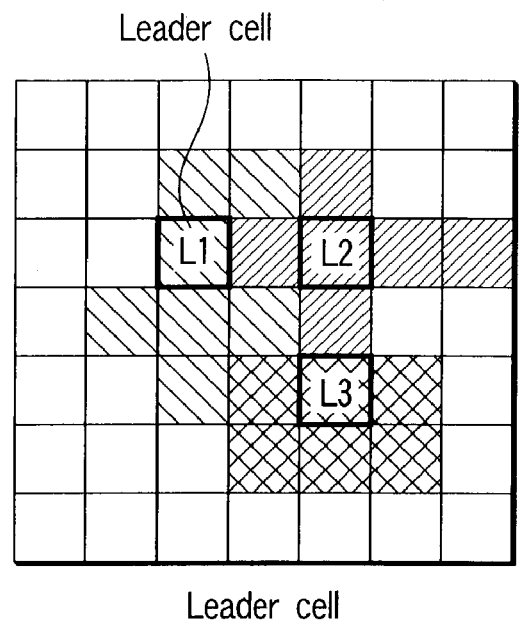
Figure 16C:
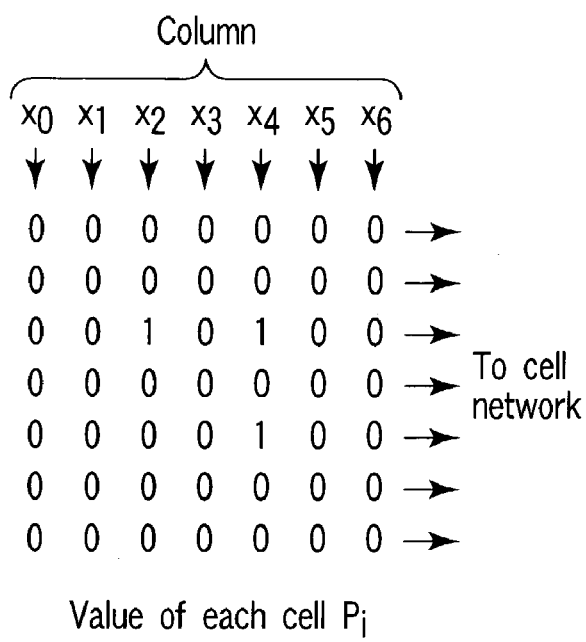

In initialization, values of the coupling weight $W_{ik}$ and pi calculated by the coupling weights calculation circuit 12 and the leader cell determination circuit 13 are transferred to the cell network 14 from the respective left-side input ports shown in FIGS. 7 and 8. If, for example, cells indicated by "$L_1$, $L_2$, and $L_3$" in FIG. 16B are to become a leader cell, the $p_i$ values of the cells are such as shown in FIG. 16C. Therefore, by shifting data in order starting from the rightmost side of the FIG. 16C to the cell network 14 (see FIG. 4), $p_i$ of each cell is initialized. The same operations are performed on the coupling weight $W_{ik}$, thereby shifting the data to the cell network 14.

Figure 16D:
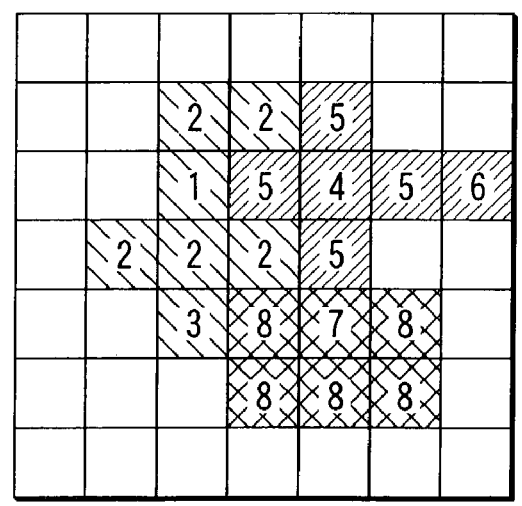

In a case where the order in which the leader cells (self-excitable cells candidate) are connected in self-excitable-cell-selection control as shown in FIG. 14, the process decides the non-excitation cells of $p_i=1$ in the connection order starting from the left top cell and determines them as a leader cell in order. In the case of FIG. 16B, the leader cells are processed in an order of $L_1$, $L_2$, and $L_3$. FIG. 16D shows an order in which the cells are excited. The excitation starts from the $L_1$ cell and, when segmentation of the region A ends, shifts to the $L_2$ cell, to segment the region B. Finally, the process starts excitation of the cell $L_3$, to complete segmentation of the region C.

Figure 17:
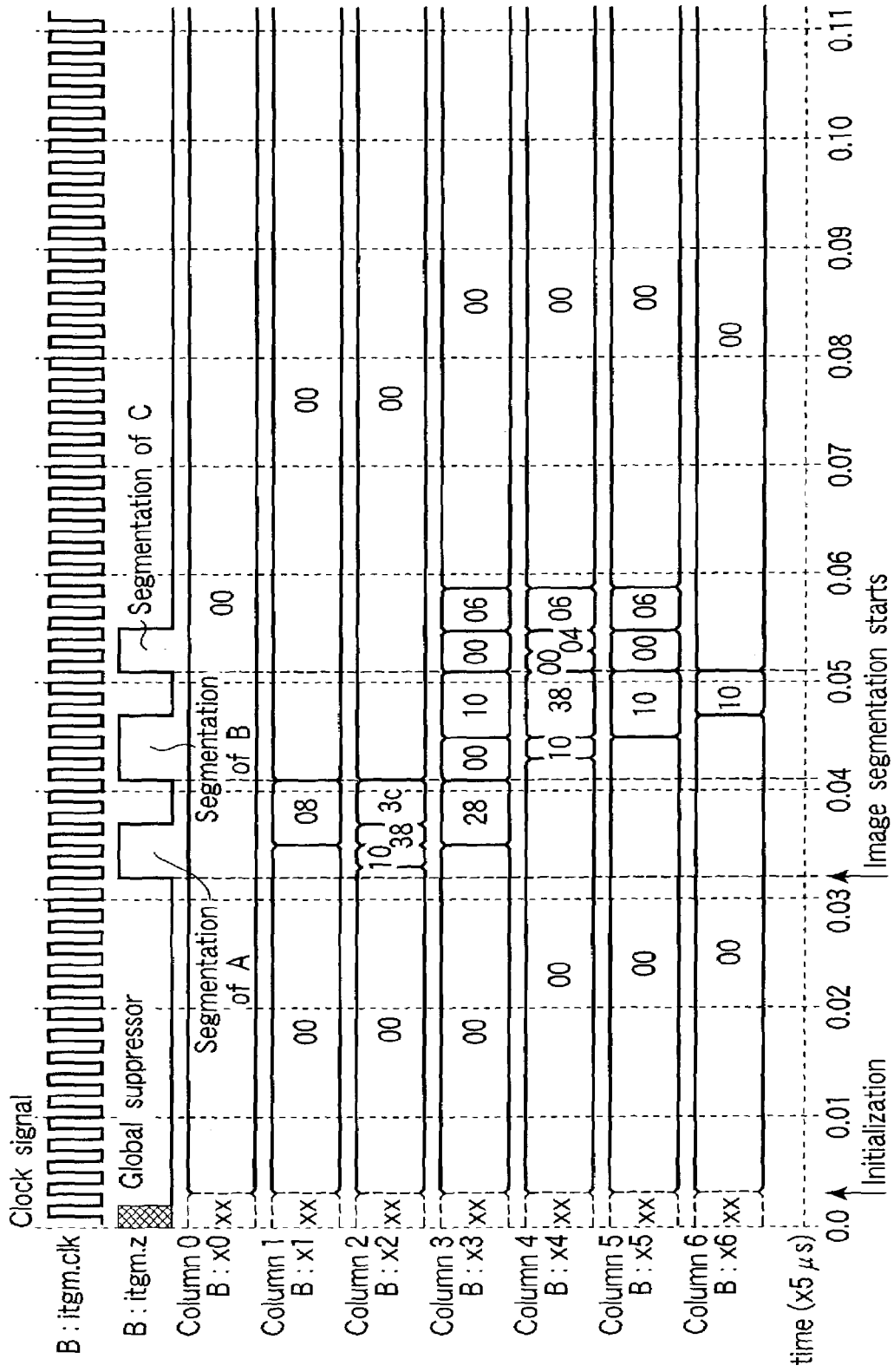
FIG. 17 is a timing chart which shows a result of simulation of image segmentation on the 7×7 images of FIG. 16A to FIG. 16D.

FIG. 17 shows part of each of signal waveform in a case where image segmentation is performed in FIG. 16A. In the figure, signal names $x_0$-$x_6$ give hexadecimal representation of the excitation state (value of $x_i$) of the cells in columns 0-6 (which correspond to columns $x_0$-$x_6$ in FIG. 16A) in a bit configuration in which the upper row is regarded to represent the high-order bits. Besides, the figure shows signal waveforms of a clock signal and the global suppressor z. A check on the excitation order based on this result indicates that the excitation starts in an order indicated by numerals shown in FIG. 16D, to perform region segmentation.

E. Effects of Image Segmentation Algorithm (Method)

To verify the effectiveness of the algorithm of the present embodiment, the inventor created a simulator in Java (registered trademark) and C languages. The Java language is used to create about 1,300 lines including input/output routines for the image data, while the C language is used to create about 340 lines of the portion of the algorithm.

Figure 18:
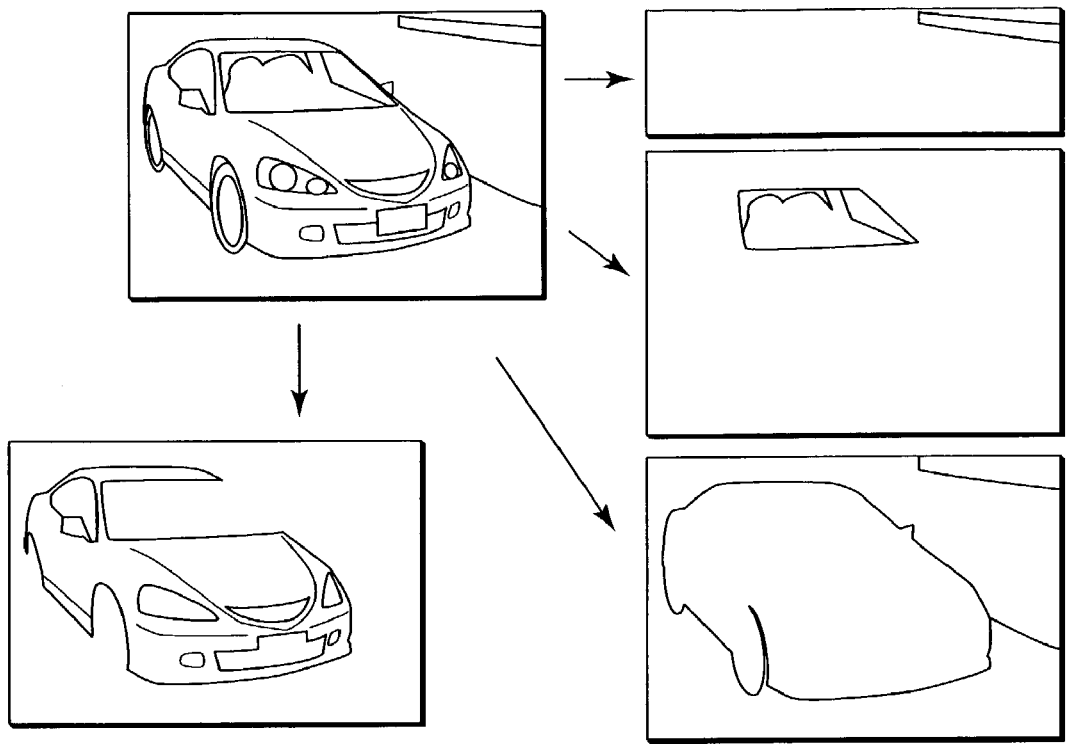
FIG. 18 is an illustration which shows one example of a display screen when the image segmentation algorithm of the same embodiment is realized as a software program in Java to execute image segmentation.

FIG. 18 shows an execution example of the image segmentation algorithm simulator created in Java on a grayscale image consisting of 320×240 pixels. As shown in the figure, the body of a white car is segmented.

Figure 19:
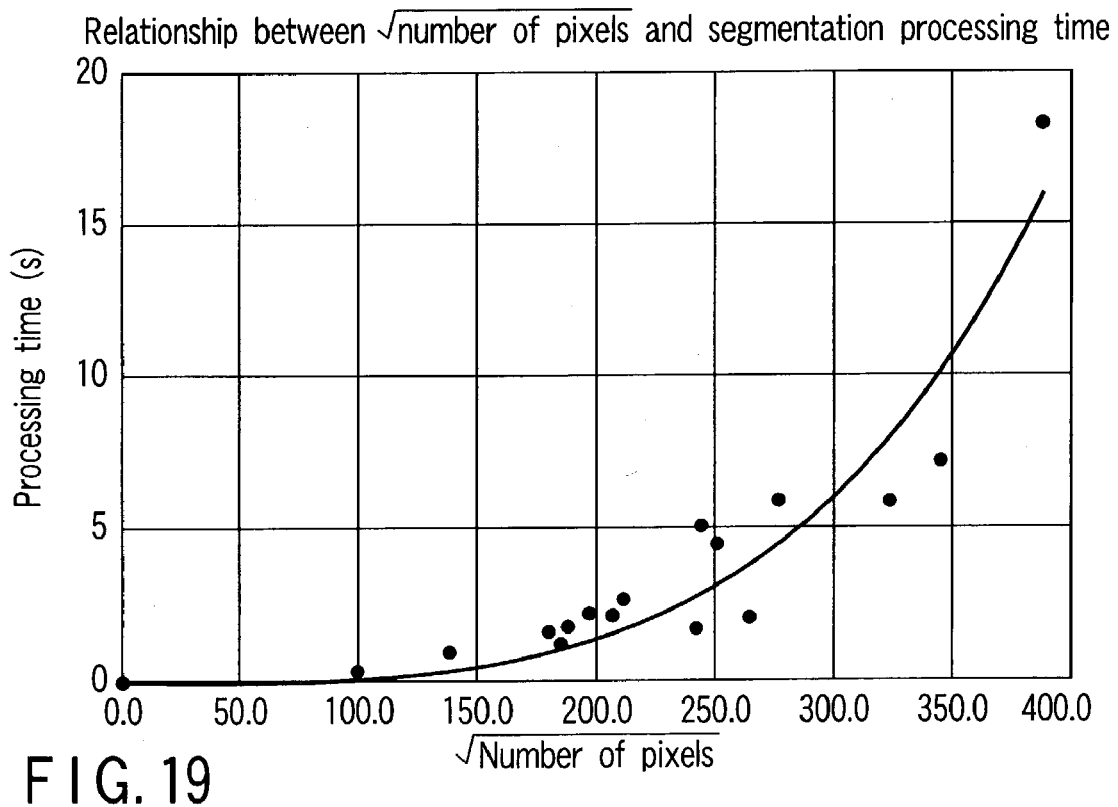
FIG. 19 is a characteristic graph which shows an experiment result of an image segmentation time in a case where the image segmentation algorithm of the same embodiment is realized in software.

FIG. 19 shows a result obtained when the algorithm of the present embodiment is installed as a sequential-processing program in the C language and executed on an Intel Pentium (registered trademark) 4 (1.3 GHz) processor. In this experiment, a plurality of sample images have been given as input data, to measure a square root of the number of pixels (which indicates the length of one side of the image) and a processing time required to segment the image. In the experiment, the processing time has been measured 100 times and averaged. As a result, it has been found that an image consisting of about 10,000 (100×100) pixels can be segmented in about 283 ms (excluding the input/output routines). Thus, the image segmentation algorithm of the present embodiment is speedy in processing and so can be used in real time processing by software on a relatively small image.

FIGS. 20A-20D respectively show examples of image segmentation on grayscale images. Further, FIGS. 21A-21D show an example of image segmentation on a color image.

As shown in FIGS. 21B and 21C, when the color image is converted into a grayscale image, the green and red colors take on the same brightness value (coupling weight) and so are segmented into the same region, which makes making image segmentation difficult in some cases. Therefore, by segmenting the color image directly by using coupling weights in the case of the color image, accurate segmentation is possible as shown in FIG. 21D even in an example where image segmentation is impossible, in the case of the grayscale image. It is thus possible to segment an image by the same algorithm and the same cell network only by changing the calculation of the coupling weight $W_{ik}$, which provides a very significant advantage.

F. Effects of Image Segmentation Architecture (Apparatus) and Integrated Circuit FIG. 22 shows a result obtained when a simulator of an image segmentation architecture based on FIGS. 4, 7 and 8 has been created in the Java and C languages, to measure the image segmentation time in simulation. A method which realizes high-speed processing shown in FIG. 12A has been used on image segmentation cells. In the simulation, a plurality of sample images have been given as input data, to measure a square root (which indicates the length of one side of the image) and the maximum and minimum processing times required in image segmentation. Further, to estimate the worst case processing time by a calculation equation, such an image segmentation time also is shown in the graph as to be expected when an image of interest is regular and consist of black-and-white lattices in a very rare case of natural images where there are many regions subject to image segmentation.

The results indicate that, if it is supposed that processing can be performed in a cycle of 10 ns (at a frequency of 100 MHz), very high-speed image segmentation is possible by which an image consisting of 160,000 (400×400) pixels can be processed in an average of 50 μs or less or, even in the worst case, 300 μs or less. Therefore, real time processing is sufficiently possible even taking into account input/output overheads.

An image segmentation integrated circuit based on the image segmentation architecture of the present embodiment has been designed using a hardware description language. In the hardware description, a method realizing high-speed processing shown in FIG. 12A has been used on image segmentation cells. In this case, the image segmentation cells are given in about 100 lines, the horizontal and vertical coupling weight registers are each given in about 100 lines, and the other peripheral circuits are given in about 300 lines.

Since the image segmentation architecture of the present embodiment has an array-shaped regular configuration as shown in FIGS. 7 and 8, a generator has been created in the C language which automatically generates an overall cell network. The cell network generator has about 400 lines. When this generator is used to generate a cell network consisting of 16×16 pixels, the entire description is created in the hardware description language over about 3,500 lines and the simulation description, about 600 lines.

The hardware description thus created has been realized in an LSI using three-layered metal wiring CMOS technologies based on a design rule of 0.35 μm. To roughly calculate the number of image segmentation cells that can be put on the chip, logic syntheses with a commercial software have been performed using a standard-cell library to estimate an area. As a result of the logic syntheses, the image segmentation cell has an area $A_{pi}$ of 26,495 μm² and the coupling weight register has an area $A_{WRk}$ of 8,873 μm². In a case where the image is a square, if each side has N number of pixels, the area $A_{total}$ of the entire cell network can be estimated by the following equation:

$$A_{total} = A_{pi} \times N^2 + A_{WRk} \times (N^2 + 2) \quad (4)$$

Thus, if the cells are to be put on a chip of 9 mm×9 mm (area of 81 mm²), about 45×45 pixels can be mounted as viewed from an estimate of the obtained cell area. If, further, it is supposed that the number of transistors and the layout area can be halved by full-custom designing, the area of the image segmentation cells and that of the coupling weight registers can both be reduced to about ¼, thereby installing about 67×67 pixels.

The areas can be further reduced by substituting a serial adder/subtractor (FIG. 12B) which performs processing serially for the adder which calculates a total sum of the weights $(S_i = \Sigma_{k \in N(i)} (W_{ik} \times x_k(t))$ in order to decide the self-excitable state in the image segmentation cell.

In this case, decision processing requires nine cycles for execution instead of one cycle, so that the total processing time increases as much as about nine times. The processing of image segmentation by use of the circuit of the present embodiment is very speedy and has no effects on real time processing, so that it is possible to process an image consisting of 160,000 (400×400) pixels in 2.7 ms or less even in the worst case estimate and in 450 μs on average. In this case, the area $Ap_i$ of the image segmentation cell is decreased to 13,953 μm², so that it is estimated that about 84×84 pixels can be installed on a 9 mm×9 mm chip using MOS technologies based on a design rule of 0.35 μm in the case of full custom designing, and about 162×162 pixels can be installed on a 9 mm×9 mm chip using CMOS technologies based on a design rule of 0.18 μm.

Table 1 shows estimated values of the number of mountable pixels in a case where they are installed in full custom designing using CMOS technologies based on design rules of 0.35 μm, 0.18 μm, and 0.09 μm. Data of the chip areas and the technologies is referred from ITRS 2000Update Road Map (Reference: "ITRS 2000 Update: The International Technology Roadmap for Semiconductors 2000 Update", URL http://public.itrs.net/(2000)). Based on this reference, it can be estimated that if CMOS technologies based on a design rule of 0.09 μm which become a standard in 2004 are used, about 972×972 pixels can be realized on one chip (area: 356 mm²) for high performance applications.

TABLE 1

Estimates of the number of pixels that can be processed by one chip (in the case of full custom designing)

| | | Technology | |
| --- | --- | --- | --- |
| | Chip area | Number of pixels that can be processed in the case of parallel adder/subtractor | Number of pixels that can be processed in the case of serial adder/subtractor |
| 0.35 μm | Standard size of 170 [mm²] | 138 × 138 (19,044) | 171 × 171 (29241) |
| | High performance size of 310 [mm²] | 186 × 186 (34,596) | 232 × 232 (53,824) |
| 0.18 μm (1999) | Standard size of 170 [mm²] | 270 × 270 (72,900) | 336 × 336 (112,896) |

TABLE 1-continued

Estimates of the number of pixels that can be processed by one chip (in the case of full custom designing)

| | | Technology | |
|---|---|---|---|
| Chip area | | Number of pixels that can be processed in the case of parallel adder/subtractor | Number of pixels that can be processed in the case of serial adder/subtractor |
| 0.09 μm (2004) | High performance size of 310 [mm$^2$] | 363 × 363 (131,769) | 452 × 452 (204,304) |
| | Standard size of 195 [mm$^2$] | 578 × 578 (334,084) | 718 × 718 (515,524) |
| | High performance size of 356 [mm$^2$] | 780 × 780 (608,400) | 972 × 972 (944,784) |

G. Key Points of Embodiments Related to the Invention

As described above, according to the method or apparatus for image segmentation based on the image segmentation algorithm and the architecture of the embodiments, real time image segmentation of color and grayscale natural images can be executed on all pixels of an input image in parallel, thereby realizing real time processing, which has been difficult using conventional image segmentation methods based on software. Further, the algorithm and the architecture make it possible to realize a real time image processing method, a real time image processing apparatus, and an image processing integrated circuit. The following will enumerate characteristics of the embodiments.

(1) A simple and high speed image segmentation algorithm can be realized not only by software, but also by a digital circuit. This algorithm expresses the cell states by a digital variable and so can be realized as a digital circuit. Therefore, by using present-day CAD techniques, it is possible to design a circuit which accommodates restrictions by automatic processing if the conditions in designing are not stringent. As a result, it is possible to design the circuit by state-of-the-art manufacturing technology relatively easily, giving an expectation of an improvement in integration density and operating speed. Further, the image segmentation algorithm is a very simple method and so can increase the processing speed of image segmentation, even in the conventional processor-based image segmentation system, by means of software.

(2) As the image segmentation architecture, there are alternately arranged in an array state the image segmentation cells (FIG. 12) which correspond to pixels and the two kinds of vertical and horizontal coupling weight registers (FIG. 9), in a realized form of the image segmentation cell network (FIGS. 7 and 8). Such a two-dimensional array structure accompanied even by realization of a smaller area can be extremely easily installed into an integrated circuit.

(3) The image segmentation cells can be realized both in a case where the adder/subtractor is used in parallel processing with importance placed on an increase in processing speed, and in a case where the adder/subtractor is used in serial processing with importance placed on a decrease in area (FIG. 12). This makes it possible to select the high speed processing and the compacting of the apparatus in accordance with service conditions.

(4) Image segmentation is realized by pipeline processing as shown in FIG. 4. This makes it possible to segment the pixels in parallel with each other by a simple configuration.

(5) By the algorithm and the architecture, cell state transition is made using the coupling weights between the adjacent cells (pixels), so that only by changing the coupling weights, it is possible to use the same algorithm and cell network for a color image and a grayscale image. Further, a portion which is different, in calculation of the coupling weight, between the color and gray scale images can be separated as a coupling weight calculation circuit from the cell network so that the calculation can be performed by pipeline processing. As a result, the area can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image segmentation method which pinpoints one of regions from an input image belonging to a same category and identifies the one region as an image segmentation region, said method comprising:
   a preparation step including,
      an initialization step of putting, into a non-excitation state, a cell which is an individual image segmentation unit corresponding to pixels of the input image,
      a taking step of pixel values of the pixels corresponding to the cell, and calculating each coupling weight between a plurality of adjacent cells, and
      a determination step of determining leader cells based on each calculation result in the taking step;
   a self-excitable cell detection step of selecting one of the leader cells determined by the determination step to detect the one leader cell as a self-excitable cell;
   a self-excitation step of putting, into an excitation state, the self-excitable cell detected in the self-excitable cell detection step;
   an excitable cell detection step of detecting an excitable cell from adjacent cells based on said coupling weights between cells in the excitation state including the leader cells and the adjacent cells;
   an excitation step of putting, into an excitation state, the excitable cell detected in the excitable cell detection step; and
   an inhibition step of putting, into an inhibition state, a cell in the excitation state if no cell is detected in the excitable cell detection step, wherein:
   image segmentation of one region is completed by repeating the excitation step until no cell is detected any more in the excitable cell detection step; and
   the image segmentation of all the regions is completed by repeating the respective steps until no leader cell in the non-excitation state is detected any more in the self-excitable cell detection step,
   wherein $I_i$ is a pixel value of the cell i (i indicates a cell number) which is an individual image segmentation unit corresponding to the pixels of the input image, $x_i$ is a variable which indicates whether the cell i is in the excitation or non-excitation state, $p_i$ is a variable which indicates whether the self-excitation is permitted or not, $W_{ik}$ is the coupling weight between the adjacent cells i and k, $\phi_p$ is a threshold value which decides whether the self-excitation is permitted or not, $\phi_z$ is a threshold value which decides whether the self-excitation is permitted or not, $z_i$ is a variable which indicates whether the state of cell i is changed or not, and z is a variable of a global suppressor which decides whether are cells having changed to the excitation state based on a logical sum of the values $z_i$'s of all the cells;

in the preparation step, the variable $x_i$ of the image segmentation cell i is set to 0 ($x_i=0$: non-excitation), the pixel values $I_i$ corresponding to the cells i are taken in to calculate the coupling weight $W_{ik}$ between the adjacent plural cells i and k, so that if a total sum of calculation results is larger than the threshold value $\phi_p$, $p_i=1$ (self-excitable state) is set and if the total sum is equal to or smaller than the threshold value $\phi_p$, $p_i=0$ (non-self-excitable state) is set for initialization, and z=0 where the variable z is the global suppressor is set for initialization;

in each self-excitable cell detection step, at least one non-excited leader cell is selected from among the leader cells of $p_i=1$ determined in the determination step to detect the selected cells as the self-excitable cells;

in each self-excitation step, the variables $x_i$ and $z_i$ of the self-excitable cells i detected in the self-excitable cell detection step are set to 1 ($x_i=1$: self-excitation, $z_i=1$: changed state), respectively;

in the excitable cell detection step, if a total sum of the coupling weights $W_{ik}$ between the excited cells k ($x_k=1$) adjacent to the cells i in the non-excitation state is larger than the threshold value $\phi_z$ the cells i are detected to be the excitable cells;

in each excitation step, the variables $x_i$ and $z_i$ of all the cells i detected in the excitable cell detection step are set to 1 ($x_i=1$: excitation state, $z_i=1$: changed state), respectively, and the variable $z_i$ of the cells i already in the excitation state ($x_i=1$ and $z_i=1$) is set to 0 ($z_i=0$: unchanged state); and in each inhibition step, if no cell is detected in the excitable cell detection step, the cells of $x_i=1$ (excitation state) are set to $x_i=0$ (non-excitation state) and $z_i=0$ (unchanged state), and if $p_i=1$, the cells are set to $p_i=0$ (inhibition state).

2. The image segmentation method according to claim 1, wherein:
when the input image is a grayscale image, a brightness value is used as the pixel value.

3. The image segmentation method according to claim 1, wherein:
when the input image is a color image, color information is used as the pixel value.

4. An image segmentation apparatus which pinpoints one of regions from an input image belonging to a same category and identifies the one region as an image segmentation region to selectively output an image of the arbitrary image segmentation region, said apparatus comprising:
an input image memory which stores pixel values of the input image;
a coupling weight calculation circuit which reads out the pixel values from the input image memory to calculate a coupling weight between each image segmentation cell corresponding to each pixel and an adjacent cell;
a leader cell determination circuit which determines, based on the coupling weights calculated by the coupling weight calculation circuit, as a leader cell, the cell in which a total sum of the coupling weights with the adjacent cells is in excess of a reference value;
an image segmentation cell network having decision means in which there are alternately arranged in an array state the image segmentation cells which transit over a non-excitation state, a self-excitable state and an excitation state in accordance with each pixel of the input image and coupling weight registers which hold the inter-cell coupling weights obtained by the coupling weight calculation circuit, the decision means deciding whether each cell is excitable or not based on values held in the coupling weight registers in which the cells are arranged adjacent to each other, the decision means putting, into the excitation state, the leader cell determined by the leader cell determination circuit and putting, into the excitation state, an excitable cell selected from the adjacent cells to expand an excitation region, thereby deciding the image segmentation region;
a segmentation region storage circuit which stores information of all the cells in the image segmentation region decided by the image segmentation cell network; and
an output image memory which stores the pixel value corresponding to each cell in an arbitrary image segmentation region based on contents stored in the segmentation region storage circuit,
wherein the coupling weight calculation circuit takes in the pixel values corresponding to the cells from the input image memory, to calculate the coupling weights between the adjacent cells in column direction by parallel processing and to calculate the coupling weights between the adjacent cells in row direction by pipeline processing.

5. The image segmentation apparatus according to claim 4, wherein:
the coupling weight calculation circuit is provided with an encoder which reduces a number of bits of a calculation result of the coupling weights.

6. The image segmentation apparatus according to claim 4, wherein:
each row of the image segmentation cell network is provided with a bus which transfers data to all the cells and the coupling weight registers.

7. The image segmentation apparatus according to claim 4, wherein:
the coupling weight register reduces a number of bits of the coupling weight data from the coupling weight calculation circuit to a permitted number of bits and stores the reduced data.

8. The image segmentation apparatus according to claim 4, wherein:
the cells of the image segmentation cell network carry out additions and subtractions required in a decision of the excitable state, serially at k number of adder/subtractors (k is an integer number smaller than the number of the adjacent cells) and at the corresponding registers.

9. The image segmentation apparatus according to claim 4, wherein:
a brightness value is used as the pixel value if the input image is a grayscale image.

10. The image segmentation apparatus according to claim 4, wherein:
color information is used as the pixel value if the input image is a color image.

11. An image segmentation apparatus which pinpoints one of regions from an input image belonging to a same category and identifies the one region as an image segmentation region to selectively output an image of the arbitrary image segmentation region, said apparatus comprising:

an input image memory which stores pixel values of the input image;

a coupling weight calculation circuit which reads out the pixel values from the input image memory to calculate a coupling weight between each image segmentation cell corresponding to each pixel and an adjacent cell by pipeline processing;

a leader cell determination circuit which determines, based on the coupling weights calculated by the coupling weight calculation circuit, as a leader cell, the cell in which a total sum of the coupling weights with the adjacent cells is in excess of a reference value;

an image segmentation cell network having decision means in which there are alternately arranged in an array state the image segmentation cells which transit over a non-excitation state, a self-excitable state and an excitation state in accordance with each pixel of the input image and coupling weight registers which hold the inter-cell coupling weights obtained by the coupling weight calculation circuit, the decision means deciding whether each cell is excitable or not based on values held in the coupling weight registers in which the cells are arranged adjacent to each other, the decision means putting, into the excitation state, the leader cell determined by the leader cell determination circuit and putting, into the excitation state, an excitable cell selected from the adjacent cells to expand an excitation region, thereby deciding the image segmentation region;

a segmentation region storage circuit which stores information of all the cells in the image segmentation region decided by the image segmentation cell network; and an output image memory which stores the pixel value corresponding to each cell in an arbitrary image segmentation region based on contents stored in the segmentation region storage circuit, wherein:

the leader cell determination circuit takes in the coupling weights corresponding to the cells from the coupling weight calculation circuit, to sequentially determine the leader cells by column-parallel pipeline processing.

12. An image segmentation apparatus which pinpoints one of regions from an input image belonging to a same category and identifies the one region as an image segmentation region to selectively output an image of the arbitrary image segmentation region, said apparatus comprising:

an input image memory which stores pixel values of the input image;

a coupling weight calculation circuit which reads out the pixel values from the input image memory to calculate a coupling weight between each image segmentation cell corresponding to each pixel and an adjacent cell by pipeline processing;

a leader cell determination circuit which determines, based on the coupling weights calculated by the coupling weight calculation circuit, as a leader cell, the cell in which a total sum of the coupling weights with the adjacent cells is in excess of a reference value;

an image segmentation cell network having decision means in which there are alternately arranged in an array state the image segmentation cells which transit over a non-excitation state, a self-excitable state and an excitation state in accordance with each pixel of the input image and coupling weight registers which hold the inter-cell coupling weights obtained by the coupling weight calculation circuit, the decision means deciding whether each cell is excitable or not based on values held in the coupling weight registers in which the cells are arranged adjacent to each other, the decision means putting, into the excitation state, the leader cell determined by the leader cell determination circuit and putting, into the excitation state, an excitable cell selected from the adjacent cells to expand an excitation region, thereby deciding the image segmentation region;

a segmentation region storage circuit which stores information of all the cells in the image segmentation region decided by the image segmentation cell network; and an output image memory which stores the pixel value corresponding to each cell in an arbitrary image segmentation region based on contents stored in the segmentation region storage circuit, wherein:

each row of the image segmentation cell network is provided with a shift register which transfers data to all the cells and the coupling weight registers.

13. An image segmentation apparatus which pinpoints one of regions from an input image belonging to a same category and identifies the one region as an image segmentation region to selectively output an image of the arbitrary image segmentation region, said apparatus comprising:

an input image memory which stores pixel values of the input image;

a coupling weight calculation circuit which reads out the pixel values from the input image memory to calculate a coupling weight between each image segmentation cell corresponding to each pixel and an adjacent cell by pipeline processing;

a leader cell determination circuit which determines, based on the coupling weights calculated by the coupling weight calculation circuit, as a leader cell, the cell in which a total sum of the coupling weights with the adjacent cells is in excess of a reference value;

an image segmentation cell network having decision means in which there are alternately arranged in an array state the image segmentation cells which transit over a non-excitation state, a self-excitable state and an excitation state in accordance with each pixel of the input image and coupling weight registers which hold the inter-cell coupling weights obtained by the coupling weight calculation circuit, the decision means deciding whether each cell is excitable or not based on values held in the coupling weight registers in which the cells are arranged adjacent to each other, the decision means putting, into the excitation state, the leader cell determined by the leader cell determination circuit and putting, into the excitation state, an excitable cell selected from the adjacent cells to expand an excitation region, thereby deciding the image segmentation region;

a segmentation region storage circuit which stores information of all the cells in the image segmentation region decided by the image segmentation cell network; and an output image memory which stores the pixel value corresponding to each cell in an arbitrary image segmentation region based on contents stored in the segmentation region storage circuit, wherein:

the image segmentation cell network is provided, as the coupling weight registers, with a vertical coupling weight register which stores the coupling weight between vertical and diagonal cells and a horizontal coupling weight register which stores the coupling weight between horizontal and diagonal cells, in which the vertical coupling weight registers and the horizontal coupling weight registers are alternately arranged between the cells so that the same coupling weight can be shared between the adjacent cells.

14. An image segmentation apparatus which pinpoints one of regions from an input image belonging to a same category and identifies the one region as an image segmentation region to selectively output an image of the arbitrary image segmentation region, said apparatus comprising:
   an input image memory which stores pixel values of the input image;
   a coupling weight calculation circuit which reads out the pixel values from the input image memory to calculate a coupling weight between each image segmentation cell corresponding to each pixel and an adjacent cell by pipeline processing;
   a leader cell determination circuit which determines, based on the coupling weights calculated by the coupling weight calculation circuit, as a leader cell, the cell in which a total sum of the coupling weights with the adjacent cells is in excess of a reference value;
   an image segmentation cell network having decision means in which there are alternately arranged in an array state the image segmentation cells which transit over a non-excitation state, a self-excitable state and an excitation state in accordance with each pixel of the input image and coupling weight registers which hold the inter-cell coupling weights obtained by the coupling weight calculation circuit, the decision means deciding whether each cell is excitable or not based on values held in the coupling weight registers in which the cells are arranged adjacent to each other, the decision means putting, into the excitation state, the leader cell determined by the leader cell determination circuit and putting, into the excitation state, an excitable cell selected from the adjacent cells to expand an excitation region, thereby deciding the image segmentation region;
   a segmentation region storage circuit which stores information of all the cells in the image segmentation region decided by the image segmentation cell network; and
   an output image memory which stores the pixel value corresponding to each cell in an arbitrary image segmentation region based on contents stored in the segmentation region storage circuit, wherein:
   the cells of the image segmentation cell network carry out additions and subtractions required in the decision of the excitable state, in parallel with each other as many adders, provided individually for each cell, as the number of the adjacent cells and one subtractor.

15. An image segmentation apparatus which pinpoints one of regions from an input image belonging to a same category and identifies the one region as an image segmentation region to selectively output an image of the arbitrary image segmentation region, said apparatus comprising:
   an input image memory which stores pixel values of the input image;
   a coupling weight calculation circuit which reads out the pixel values from the input image memory to calculate a coupling weight between each image segmentation cell corresponding to each pixel and an adjacent cell by pipeline processing;
   a leader cell determination circuit which determines, based on the coupling weights calculated by the coupling weight calculation circuit, as a leader cell, the cell in which a total sum of the coupling weights with the adjacent cells is in excess of a reference value;
   an image segmentation cell network having decision means in which there are alternately arranged in an array state the image segmentation cells which transit over a non-excitation state, a self-excitable state and an excitation state in accordance with each pixel of the input image and coupling weight registers which hold the inter-cell coupling weights obtained by the coupling weight calculation circuit, the decision means deciding whether each cell is excitable or not based on values held in the coupling weight registers in which the cells are arranged adjacent to each other, the decision means putting, into the excitation state, the leader cell determined by the leader cell determination circuit and putting, into the excitation state, an excitable cell selected from the adjacent cells to expand an excitation region, thereby deciding the image segmentation region;
   a segmentation region storage circuit which stores information of all the cells in the image segmentation region decided by the image segmentation cell network; and
   an output image memory which stores the pixel value corresponding to each cell in an arbitrary image segmentation region based on contents stored in the segmentation region storage circuit, wherein:
   the image segmentation cell network comprises:
   self-excitation means for putting into the excitation state the leader cell determined by the leader cell determination circuit;
   excitable cell detection means for detecting the excitable cell from the adjacent cells based on the coupling weights between the cell in the excitation state and the cells adjacent to the cell in the excitation state;
   excitation means for putting into the excitation state the cells detected by the excitable cell detection means; and
   inhibition means for putting into the inhibition state the cells in the excitation state in a case where no cell is detected by the excitable cell detection means;
   wherein the image segmentation of one region is completed by performing repeated processing of the excitation means concurrently on the cells detected by the excitable cell detection means until no cell is detected anymore by the excitable cell detection means, so that the image segmentation of all the regions is completed by sequentially performing the processing of the respective self-excitation, excitable cell detection, excitation and inhibition means on the cells and leader cells in the non-excitation state and not in the inhibition state.

16. An image processing method including an image segmentation which pinpoints one of regions from an input image belonging to a same category and identifies the one region as an image segmentation region, said method comprising:
   a preparation step including,
      an initialization step of putting, into a non-excitation state, a cell which is an individual image segmentation unit corresponding to pixels of the input image,
      a taking step of pixel values of the pixels corresponding to the cell, and calculating each coupling weight between a plurality of adjacent cells, and
      a determination step of determining leader cells based on each calculation result in the taking step;
   a self-excitable cell detection step of selecting one of the leader cells determined by the determination step to detect the one leader cell as a self-excitable cell;
   a self-excitation step of putting, into an excitation state, the self-excitable cell detected in the self-excitable cell detection step;

an excitable cell detection step of detecting an excitable cell from adjacent cells based on said coupling weights between cells in the excitation state including the leader cells and the adjacent cells;

an excitation step of putting, into an excitation state, the excitable cell detected in the excitable cell detection step; and an inhibition step of putting, into an inhibition state, a cell in the excitation state if no cell is detected in the excitable cell detection step, wherein:

image segmentation of one region is completed by repeating the excitation step until no cell is detected any more in the excitable cell detection step; and the image segmentation of all the regions is completed by repeating the respective steps until no leader cell in the non-excitation state is detected any more in the self-excitable cell detection step, wherein $I_i$ is a pixel value of the cell i (i indicates a cell number) which is an individual image segmentation unit corresponding to the pixels of the input image, $x_i$ is a variable which indicates whether the cell i is in the excitation or non-excitation stat, $p_i$ is a variable which indicates whether the self-excitation is permitted or not, $W_{ik}$ is the coupling weight between the adjacent cells i and k, $\phi_p$ is a threshold value which decides whether the self-excitation is permitted or not, $\phi_z$ is a threshold value which decides whether the self-excitation is permitted or not, $z_i$ is a variable which indicates whether the state of cell i is changed or not, and z is a variable of a global suppressor which decides whether are cells having changed to the excitation state based on a logical sum of the values $z_i$'s of all the cells;

in the preparation step, the variable $x_i$ of the image segmentation cell i is set to 0 ($x_i=0$: non-excitation), the pixel values $I_i$ corresponding to the cells i are taken in to calculate the coupling weight $W_{ik}$ between the adjacent plural cells i and k, so that if a total sum of calculation results is larger than the threshold value $\phi_p$, $p_i=1$ (self-excitable state) is set and if the total sum is equal to or smaller than the threshold value $\phi_p$, $p_i=0$ (non-self-excitable state) is set for initialization, and z=0 where the variable z is the global suppressor is set for initialization;

in each self-excitable cell detection step, at least one non-excited leader cell is selected from among the leader cells of $p_i=1$ determined in the determination step to detect the selected cells as the self-excitable cells;

in each self-excitation step, the variables $x_i$ and $z_i$ of the self-excitable cells i detected in the self-excitable cell detection step are set to 1 ($x_i=1$: self-excitation, $z_i=1$: changed state), respectively;

in the excitable cell detection step, if a total sum of the coupling weights $W_{ik}$ between the excited cells k ($x_k=1$) adjacent to the cells i in the non-excitation state is larger than the threshold value $\phi_z$, the cells i are detected to be the excitable cells;

in each excitation step, the variables $x_i$ and $z_i$ of all the cells i detected in the excitable cell detection step are set to 1 ($x_i=1$: excitation state, $z_i=1$: changed state), respectively, and the variable $z_i$ of the cells i already in the excitation state ($x_i=1$ and $z_i=1$) is set to 0 ($z_i=0$: unchanged state); and in each inhibition step, if no cell is detected in the excitable cell detection step, the cells of $x_i=1$ (excitation state) are set to $x_i=0$ (non-excitation state) and $z_i=0$ (unchanged state), and if $p_i=1$, the cells are set to $p_i=0$ (inhibition state).

17. An image processing apparatus integrated circuit apparatus for processing an image including an image segmentation which pinpoints one of regions from an input image belonging to a same category and identifies the one region as an image segmentation region to selectively output an image of the arbitrary image segmentation region, said apparatus comprising:

an input image memory which stores pixel values of the input image;

a coupling weight calculation circuit which reads out the pixel values from the input image memory to calculate a coupling weight between each image segmentation cell corresponding to each pixel and an adjacent cell;

a leader cell determination circuit which determines, based on the coupling weights calculated by the coupling weight calculation circuit, as a leader cell, the cell in which a total sum of the coupling weights with the adjacent cells is in excess of a reference value;

an image segmentation cell network having decision means in which there are alternately arranged in an array state the image segmentation cells which transit over a non-excitation state, a self-excitable state and an excitation state in accordance with each pixel of the input image and coupling weight registers which hold the inter-cell coupling weights obtained by the coupling weight calculation circuit, the decision means deciding whether each cell is excitable or not based on values held in the coupling weight registers in which the cells are arranged adjacent to each other, the decision means putting, into the excitation state, the leader cell determined by the leader cell determination circuit and putting, into the excitation state, an excitable cell selected from the adjacent cells to expand an excitation region, thereby deciding the image segmentation region;

a segmentation region storage circuit which stores information of all the cells in the image segmentation region decided by the image segmentation cell network; and an output image memory which stores the pixel value corresponding to each cell in an arbitrary image segmentation region based on contents stored in the segmentation region storage circuit, wherein the coupling weight calculation circuit takes in the pixel values corresponding to the cells from the input image memory, to calculate the coupling weights between the adjacent cells in a column direction by parallel processing and to calculate the coupling weights between the adjacent cells in a row direction by pipeline processing.

18. An image segmentation apparatus which pinpoints one of regions from an input image belonging to a same category and identifies the one region as an image segmentation region to selectively output an image of the arbitrary image segmentation region, said apparatus comprising:

an input image memory which stores pixel values of the input image;

a coupling weight calculation circuit which reads out the pixel values from the input image memory to calculate a coupling weight between each image segmentation cell corresponding to each pixel and an adjacent cell;

a leader cell determination circuit which determines, based on the coupling weights calculated by the coupling weight calculation circuit, as a leader cell, the cell in which a total sum of the coupling weights with the adjacent cells is in excess of a reference value;

an image segmentation cell network having decision means in which there are alternately arranged in an array state the image segmentation cells which transit over a non-excitation state, a self-excitable state and an excitation state in accordance with each pixel of the input image and coupling weight registers which hold the inter-cell coupling weights obtained by the coupling weight calculation circuit, the decision means deciding whether each cell is excitable or not based on values held in the coupling weight registers in which the cells are arranged adjacent to each other, the decision means putting, into the excitation state, the leader cell determined by the leader cell determination circuit and putting, into the excitation state, an excitable cell selected from the adjacent cells to expand an excitation region, thereby deciding the image segmentation region;

a segmentation region storage circuit which stores information of all the cells in the image segmentation region decided by the image segmentation cell network; and an output image memory which stores the pixel value corresponding to each cell in an arbitrary image segmentation region based on contents stored in the segmentation region storage circuit, wherein the coupling weight calculation circuit takes in the pixel values corresponding to the cells from the input image memory, to calculate the coupling weights between the adjacent cells by parallel processing and to calculate the coupling weights between the adjacent cells in row direction by pipeline processing.

19. The image segmentation apparatus according to claim 18, wherein:

the coupling weight calculation circuit is provided with an encoder which reduces a number of bits of a calculation result of the coupling weights.

20. The image segmentation apparatus according to claim 18, wherein:

each row of the image segmentation cell network is provided with a bus which transfers data to all the cells and the coupling weight registers.

21. The image segmentation apparatus according to claim 18, wherein:

the coupling weight register reduces a number of bits of the coupling weight data from the coupling weight calculation circuit to a permitted number of bits and stores the reduced data.

22. The image segmentation apparatus according to claim 18, wherein:

the cells of the image segmentation cell network carry out additions and subtractions required in decision of the excitable state, serially at k number of adder/subtractors (k is an integer number smaller than the number of the adjacent cells) and at the corresponding registers.

23. The image segmentation apparatus according to claim 18, wherein:

a brightness value is used as the pixel value if the input image is a grayscale image.

24. The image segmentation apparatus according to claim 18, wherein:

color information is used as the pixel value if the input image is a color image.

* * * * *